(12) United States Patent
Barker et al.

(10) Patent No.: US 12,371,346 B2
(45) Date of Patent: Jul. 29, 2025

(54) O3/P2 MIXED PHASE SODIUM-CONTAINING DOPED LAYERED OXIDE MATERIALS

(71) Applicant: FARADION LIMITED, South Yorkshire (GB)

(72) Inventors: Jeremy Barker, Chipping Norton (GB); Richard Heap, Abingdon (GB)

(73) Assignee: FARADION LIMITED, South Yorkshire (GB)

( * ) Notice: Subject to any disclaimer, the term of this patent is extended or adjusted under 35 U.S.C. 154(b) by 958 days.

(21) Appl. No.: 17/045,660

(22) PCT Filed: Apr. 8, 2019

(86) PCT No.: PCT/GB2019/051022
§ 371 (c)(1),
(2) Date: Oct. 6, 2020

(87) PCT Pub. No.: WO2019/197812
PCT Pub. Date: Oct. 17, 2019

(65) Prior Publication Data
US 2021/0155501 A1    May 27, 2021

(30) Foreign Application Priority Data

Apr. 9, 2018 (GB) .................................... 1805884

(51) Int. Cl.
| | | |
|---|---|---|
| *C01G 53/66* | (2025.01) | |
| *C01G 49/00* | (2006.01) | |
| *C01G 53/50* | (2025.01) | |
| *H01M 4/505* | (2010.01) | |
| *H01M 4/525* | (2010.01) | |
| *H01M 10/054* | (2010.01) | |
| *H01M 4/02* | (2006.01) | |

(52) U.S. Cl.
CPC ........... *C01G 53/66* (2013.01); *C01G 49/009* (2013.01); *C01G 53/50* (2013.01); *H01M 4/505* (2013.01); *H01M 4/525* (2013.01); *H01M 10/054* (2013.01); *C01P 2002/72* (2013.01); *C01P 2004/40* (2013.01); *C01P 2004/41* (2013.01); *C01P 2004/82* (2013.01); *C01P 2006/40* (2013.01); *H01M 2004/028* (2013.01)

(58) Field of Classification Search
CPC ...... C01G 53/66; C01G 49/009; C01G 53/50; C01P 2002/72; C01P 2004/40; C01P 2004/41; C01P 2004/82; C01P 2006/40
See application file for complete search history.

(56) References Cited

U.S. PATENT DOCUMENTS

| | | | | |
|---|---|---|---|---|
| 2016/0181607 A1* | 6/2016 | Kendrick | ............... | C01G 51/50 252/182.1 |
| 2016/0329564 A1* | 11/2016 | Barker | .................... | C01G 53/42 |
| 2017/0190595 A1* | 7/2017 | Sayers | ............. | H01M 10/0525 |
| 2017/0222228 A1* | 8/2017 | Imazaki | ................ | C01G 53/50 |
| 2018/0090758 A1* | 3/2018 | Xu | ........................ | H01M 4/485 |

FOREIGN PATENT DOCUMENTS

| | | |
|---|---|---|
| CN | 104704654 A | 6/2015 |
| CN | 106414337 A | 2/2017 |
| CN | 107108265 A | 8/2017 |
| CN | 107848837 A | 3/2018 |
| JP | 2008137837 A | 6/2008 |
| JP | 2017508697 A | 3/2017 |
| JP | 2017521815 A | 8/2017 |
| WO | 2014/057258 | 4/2014 |
| WO | 2015/104543 | 7/2015 |
| WO | 2015/177544 | 11/2015 |
| WO | 2017/125279 | 7/2017 |

OTHER PUBLICATIONS

Office action, dated Jul. 1, 2022, issued for corresponding Chinese Patent Application No. CN201980037358.2.
Office action, dated Aug. 2, 2022, issued for corresponding Japanese patent application No. JP2020-555063.
Keller, Marlou, Daniel Buchholz, and Stefano Passerini. "Layered Na-ion cathodes with outstanding performance resulting from the synergetic effect of mixed P-and O-type phases." Advanced energy materials 6.3 (2016): 1501555.
Office action, dated Oct. 12, 2022, issued for corresponding Indian Patent Application No. 202017043775.
Office action, dated Feb. 24, 2023, issued for corresponding Chinese Patent Application No. 201980037358.2.
Office action, dated Sep. 6, 2022, issued for corresponding Indonesian Patent Application No. Id P00202007370.
International Search Report and Written Opinion dated Jun. 3, 2019, from International Application No. PCT/GB2019/051022, 15 pages.
Delmas, C. et al. "Structural classification and properties of the layered oxides" Physica B+C, vol. 99, Issues 1-4, Jan. 1980, pp. 81-85.
Shin, Y. J. et al. "Preparation and structural properties of layer-type oxides NaxNix/2Ti1-x/2O2 (0.60≤ x≤ 1.0)", Solid State Ionics vol. 132, Issues 1-2, Jul. 1, 2000, pp. 131-141.

(Continued)

*Primary Examiner* — Milton I Cano
*Assistant Examiner* — Joshua P McClure
(74) *Attorney, Agent, or Firm* — Meunier Carlin & Curfman LLC

(57) ABSTRACT

The invention relates to O3/P2 mixed-phase sodium-containing doped layered oxide materials which comprise a mixture of a first phase with an O3-type structure and a second phase with a P2-type structure; wherein the O3:P2 mixed-phase sodium-containing doped layered oxide material has the general formula: $Na_a A_b M^1{}_c\ M^2{}_d\ M^3{}_e M^4{}_f\ M^5 O_{2\pm\delta}$. The invention also provides a process for making such O3/P2 mixed-phase sodium-containing doped layered oxide materials, and use applications therefor.

9 Claims, 11 Drawing Sheets

(56) References Cited

OTHER PUBLICATIONS

Pollet, M. et al. "Structure and Properties of Alkali Cobalt Double Oxides A0.6CoO2 (A=Li, Na and K)", J. Inorg. Chem. 2009, 48 (20), 9671-9683.

Lei, Y. et al. "Synthesis and Stoichiometry of Different Layered Sodium Cobalt Oxides", Chem. Mater., 2014, 26 (18), pp. 5288-5296.

Lu Z.H., et al. "Can All the Lithium be Removed from T 2-Li2 / 3 [ Ni1 / 3Mn2 / 3 ] O2?", Journal of The Electrochemical Society, 2001, 148, A710-715.

Meng, S. et al. "An advanced cathode for Na-ion batteries with high rate and excellent structural stability", Physical Chemistry Chemical Physics 2013, 15, 3304.

Clement, R. et al. "Review—Manganese-Based P2-Type Transition Metal Oxides as Sodium-ion Battery Cathode Materials", Journal of The Electrochemical Society, 162 (14) A2589-A2604 (2015).

Guo, S. et al. "A layered P2- and 03-type composite as a highenergy cathode for rechargeable sodium-ion batteries", Angewandte Chemie 54, 5894-5899, 2015.

Qi, X. et al. "Design and comparative Study of 03/P2 Hybrid Structures for Room Termperature Sodium-Ion Batteries", ACS Applied Material and Interfaces, vol. 9, No. 46, Jul. 11, 2017.

Bianchini, M. et al. "Layered P2-03 sodium-ion cathodes derived from earth abundant elements", Journal of Material Chemistry A, vol. 6, No. 8, Jan. 1, 2018.

Ortiz-Vitoriano, N. et al. "High performance manganese based layered oxide cathodes: overcoming the challenges of sodium ion batteries", Energy & Environmental Science, vol. 10, No. 5, Jan. 1, 2017.

Written Opinion of the International Preliminary Examining Authority dated Apr. 3, 2020, from International Application No. PCT/GB2019/051022, 6 pages.

Notification of Transmittal of the International Preliminary Report on Patentability dated Sep. 3, 2020, from International Application No. PCT/GB2019/051022, 21 pages.

Office action, dated Nov. 7, 2022, issued for corresponding Philippines Patent Application No. 1-2020-551622.

Extended European Search Report mailed Nov. 20, 2023 in EP application 23181579.6 (10 pages).

Notification of third party observation mailed Aug. 17, 2023 in KR application 10-2020-7030098 (with Machine translation) (4 pages).

Examination Report, dated Nov. 17, 2023, issued for corresponding Australian Patent Application No. 2019253500.

Tian Fengren, "Structural Foundation of Inorganic Material", Metallurgical Industry Press, Jun. 1993pp. 141-144 (with English Translation) (10 pages).

Reexamination Decision mailed Sep. 12, 2024 in corresponding CN Application 201980037358.2 (English Translation only) (14 pages).

Notification of Reexamination mailed Jul. 1, 2024 in corresponding CN Application 201980037358.2 (with English translation) (14 pages).

Office Action mailed Nov. 27, 2023 in corresponding CN Application 201980037358.2 (with English translation) (13 pages).

Office Action mailed Aug. 31, 2023 n corresponding CN Application 201980037358.2 (with English translation) (15 pages).

* cited by examiner

O3/P2 MIXED PHASE SODIUM-CONTAINING DOPED LAYERED OXIDE MATERIALS

FIELD OF THE INVENTION

The present invention relates to novel O3/P2 mixed phase sodium-containing doped layered oxide materials and to a process for making the same. Further, the invention relates to the use of one or more of these novel O3/P2 mixed phase sodium-containing doped layered oxide materials as electrode active materials for use in energy storage devices such as batteries, especially rechargeable batteries, alkali-metal-ion cells, electrochemical devices and electrochromic devices; and to energy storage devices which contain one or more electrodes comprising one or more of the novel O3/P2 mixed-phase sodium-containing doped layered oxide materials.

BACKGROUND OF THE INVENTION

Sodium-ion batteries are analogous in many ways to the lithium-ion batteries that are in common use today; they are both reusable secondary batteries that comprise an anode (negative electrode), a cathode (positive electrode) and an electrolyte material, both are capable of storing energy, and they both charge and discharge via a similar reaction mechanism. When a sodium-ion (or lithium-ion battery) is charging, $Na^+$ (or $Li^+$) ions de-intercalate from the cathode and insert into the anode. Meanwhile charge balancing electrons pass from the cathode through the external circuit containing the charger and into the anode of the battery. During discharge the same process occurs but in the opposite direction.

Lithium-ion battery technology has enjoyed a lot of attention in recent years and provides the preferred portable battery for most electronic devices in use today; however lithium is not a cheap metal to source and is considered too expensive for use in large scale applications. By contrast sodium-ion battery technology is still in its relative infancy but is seen as advantageous; sodium is much more abundant than lithium and some researchers predict this will provide a cheaper and more durable way to store energy into the future, particularly for large scale applications such as storing energy on the electrical grid. Nevertheless a lot of work has yet to be done before sodium-ion batteries are a commercial reality.

Metal oxides with the general formula $A_xMO_2$ (where A represents one or more alkali metal ions and M represents one or more metal ions at least one of which has several oxidation states, for example a transition metal) are known to crystallise in a number of different layered structures. This is described in detail by C. Delmas et al in "Structural Classification and Properties of the Layered Oxides", Physica 99B (1980) 81-85. In summary, the structures are all made up of $MO_6$ edge sharing octahedra which form $(MO_2)_n$ sheets. These sheets are stacked one on top of the other and are separated by the alkali metal atoms and the exact position of the alkali metal will dictate whether the overall structure of the metal oxide is to be described as octahedral (O), tetrahedral (T) or prismatic (P). In a lattice made up of hexagonal sheets, there are three possible positions for the oxygen atoms, conventionally named A, B and C. It is the order in which these sheets are packed together that leads to the O, T and P environments. The number 2 or 3 is also used to describe the number of alkali metal layers in the repeat unit perpendicular to the layering. For example, when the layers are packed in the order ABCABC, an O3 structure is obtained. This translates to 3 alkali metal layers in the repeat unit and each alkali metal being in an octahedral environment. Such materials are characterised by the alkali metal ions being in octahedral orientation and typical compounds of this structure are $A_xMO_2$ (x≤1). The order ABAB with the alkali metal ions in tetrahedral orientation will yield a T1 structure which is typified by $A_2MO_2$ compounds. Packing the sheets in ABBA order gives a P2 structure in which one half of the prism shares edges with $MO_6$ octahedra and the other half shares faces and typical compounds are $A_{\sim 0.7}MO_2$. And finally, packing in ABBCCA order results in a P3 structure type in which all prisms share one face with one $MO_6$ octahedron and three edges with three $MO_6$ octahedra of the next sheet. $A_{\sim 0.5}MO_2$ compounds are found to adopt the P3 structure. It will be noted that Delmas' work indicates that the amount of alkali metal present in the $A_xMO_2$ material has a direct bearing on the overall structure of the metal oxide.

Investigating $A_xMO_2$ compounds further, Y. J. Shin et al. report, in Solid State Ionics 132 (2000) 131-141, the preparation and structural properties of layer-type oxides $Na_xNi_{x/2}Ti_{1-x/2}O_2$ in which x is in the range 0.6≤x≤1.0. In particular, this paper discloses that a single phase rhombohedral (type O) is observed when 0.72<x≤1.0 and a single phase hexagonal lattice (type P) is observed when 0.6≤x≤0.72. This paper also notes that although a mixture of both structure types, O and P, are produced when 0.6≤x≤0.72 is heated at around 1223 K (approximately 950° C.), when this mixture is heated to more than around 1373K (approximately 1100° C.) a single phase P structure type is produced.

Other workers, for example M. Pollet et al in their work entitled "Structure and Properties of Alkali Cobalt Double Oxides $A_{0.6}CoO_2$ (A=Li, Na and K) J. Inorg. Chem. 2009, 48, 9671-9683, report that when A is lithium, the compound crystallizes in the O3 structure, when A is sodium it adopts a P'3 structure and when A is potassium, it is a P2 system. Meanwhile, G. Ceder et al describe in "Synthesis and Stoichiometry of Different Layered Sodium Cobalt Oxides" Chem. Mater. 2014, 26, 5288-5796, further insight into a relationship that appears to exist between sodium content and lattice parameters; they conclude that when $Na_xCoO_2$ is heated between 450 and 750° C. and x is from 0.60 to 1.05, it is only possible to obtain the single phase domains O3, O'3 and P'3 when x is specifically at 1.00, 0.83, 0.67, respectively, and the single P2 phase is obtained when x is in the range 0.68 to 0.76.

Finally, literature by Shaohua Guo et al.: "A layered P2- and O3-type composite as a high-energy cathode for rechargeable sodium-ion batteries (Angewandte Chemie 54, 5894-5899, 2015) describes compounds of the general formula: $Na_{0.66}Li_{0.18}Mn_{0.71}Ni_{0.21}Co_{0.08}O_{2-\delta}$, which, using values for δ typically known in the art (i.e. in the range 0 to 0.1), are calculated to be compounds that contain manganese ions in oxidation state less than 4+. Such compounds are quite different from and will behave, electrochemically speaking, quite differently from the materials of the present invention.

The requirements for a rechargeable battery, in terms of cost, capacity, weight, voltage, and cell volume, will depend on its end use application requirements. For example, compact battery packs, with a high volumetric energy density will be needed for domestic and commercial load-levelling applications, whereas portable electronics devices require both light and low volume battery packs, that is, high gravimetric and volumetric energy densities; other applications may require high power and for these the cell must achieve a high operating voltage and exhibit high ionic and electronic conductivities.

It is generally known that the layered sodium ion battery cathode materials (e.g. sodium transition metal oxides ($Na_xMO_2$ compounds)) which achieve the highest charge density and the best rate capability, are typically Na-deficient (x=0.6 to 0.72) and they are P2 phase materials. For example, Lu and Dahn, J. Electrochem. Soc., 2001, 148, A710-715, demonstrate that the P2-layered oxide $Na_{2/3}$ $[Ni_{1/3} Mn_{2/3}]O_2$ can reversibly exchange Na-ions in sodium half cells. Further, Shirley Meng and D. H. Lee, Phys. Chem. Chem. Phys., 2013, 15, 3304, report that P2-$Na_{2/3}[Ni_{1/3} Mn_{2/3}]O_2$ exhibits excellent cycling and a high rate capability, although it is noted that these results are only achieved when the material is charged below 4.22V; above 4.22V, the charge capacity in not maintained during cycling due to the phase transformation from P2 to O2.

By contrast, sodium transition metal oxides ($Na_xMO_2$ compounds) which achieve the highest specific energy typically contain more sodium (x=0.72 to 1.00) and structure analysis shows that they are O3 phase materials.

As described in a "Review Manganese-Based P2-Type Transition Metal Oxides as Sodium-ion Battery Cathode Materials" by R. J Clement et al published in J. Electrochem Soc., 162 (14) A2589-A2604 (2015), several research groups have investigated composite layered transition metal-oxide cathode materials and recent work has shown that the incorporation of lithium into $NaNi_{0.5}Mn_{0.5}O_2$ leads to topotactic intergrowth of P2 and O3 domains in the structure, and the production of materials with enhanced specific capacity and rate performance. The high capacity being achieved because the O3 phase provides a larger sodium-ion reservoir, and the high rate performance is achieved because the P2 layered spacing enables the easy diffusion of the $Na^+$ ions, during charge and discharge operations. Patent application PCT/GB2015/051482 is directed to a mixture of doped nickelate-containing compositions comprising a first component-type of one or more components with an O3 phase structure in which the amount of alkali metal is 0.85 to 1 and the amount of nickel is <0.5, together with one or more further component types selected from one or more of a second component-type of one or more components with a P2 phase structure in which the amount of alkali metal is 0.4 to <1 and the amount of nickel is <0.5, and a third component-type of one or more components with a P3 phase structure in which the amount of alkali metal is 0.4 to <1 and the amount of nickel is <0.5. It will be noted that the O3, P2 and P3 structure for each of the first, second and third component types appears to be determined by the amount of alkali metal which they each contain. The mixed phase compositions are described as prepared by either mixing together a ready-made O3 phase material with a ready-made P2 phase material and/or P3 phase material, or by heating a mixture of precursor materials for the O3, P2 and/or P3 materials. Specifically in respect of the latter case, the resulting mixed phase compositions are disclosed in the form of a "weight average" formula and this is explained to have been determined from the relative proportions of the starting materials, and, categorically, not from any direct measurement or compositional analysis of the resultant mixed phase composition itself. Some of the specific examples in this prior art indicate, firstly by their description in terms of their weight average formula, and secondly from the presented XRD patterns, that the resultant mixed phase compositions contain a mixture of two or more the phase types. However, not only is there is no disclosure in this prior art about the actual ratio which was achieved for these two or more phase types, but this prior art explicitly teaches that the ratio, whatever it is, is determined by whichever is the most thermodynamically preferred mixture of compositions for the O3, P2 and P3 phases and that this will be based on the relative proportions of the starting materials. As described above, to produce an O3 phase-type material the starting materials must contain from 0.85 to 1 part of alkali metal, and to be a P2 phase-type material, the starting material must contain 0.4 to less than 1 part of alkali metal.

In contrast to the teaching in the prior art as discussed above, the current workers have discovered that altering the amount of alkali metal in a layered oxide material is not the only way to control the phase structure of the material, i.e. to control whether the material adopts an O3 or a P2 phase structure. Further they have surprisingly discovered that when making any particular sodium-containing doped layered oxide material (within a range of possible chemical formulae), from a mixture of precursor materials which are chosen to provide the stoichiometric ratios of metal atoms that are present in the particular sodium-containing doped layered oxide material, it is possible, depending on the exact process used, to prepare a sodium-containing doped layered oxide material which has either a single O3 phase structure, or a single P2 phase structure, or a mixture of O3 and P2 phase structures; the latter may be P2-rich or O3-rich or an equality of P2 and O3. Still further surprisingly, the present workers have discovered that where a mixture of phases co-exist, certain ratios of O3 to P2 phases will have a significant influence on the electrochemical performance delivered by the sodium-containing doped layered oxide material. Consequently, it is possible to select particular reaction conditions (as opposed to choosing an amount of alkali metal present) to tailor the relative O3/P2 phase ratio and this, in turn, can result in active materials with superior specific rate capability and discharge energies, and increased cycle lives.

The present invention therefore provides significant improvements in terms of i) providing a novel range of O3/P2 mixed phase sodium-containing doped layered oxide materials; ii) providing a novel range of O3/P2 mixed phase sodium-containing doped layered oxide materials which deliver an electrochemical performance which is superior to that of other known sodium-containing doped layered oxide materials, thereby making them particularly suited to being used as electrode active materials for electrodes, particularly cathode (positive) electrodes, energy storage devices such as batteries, especially rechargeable batteries, sodium-ion cells, electrochemical devices and electrochromic devices. And iii) providing a novel, simple and cost effective process for controlling, and thereby tailoring, the O3/P2 phase ratio in sodium-containing doped layered oxide materials to produce materials with particular electrochemical characteristics.

The present invention therefore provides an O3/P2 mixed-phase sodium-containing doped layered oxide material which comprises a mixture of phases, wherein a first phase has an O3-type structure and a second phase has a P2-type structure; further wherein the mixed-phase sodium-containing doped layered oxide material has the general formula:

$$Na_aA_bM^1_cM^2_dM^3_eM^4_fM^5_gO_{2\pm\delta};$$

wherein:
A is an alkali metal selected from at least one of lithium and potassium;
$M^1$ is one or more metals with an average oxidation state of 2+;

$M^2$ is one or more metals with an average oxidation state of 4+;

$M^3$ is one or more metals with an average oxidation state of 2+;

$M^4$ is one or more metals with an average oxidation state of 4+; and $M^5$ is one or more metals with an average oxidation state of 3+ wherein:

a>0;

a>b, preferably b=0;

$0.75 \le (a+b) \le 1.0$; preferably $0.75 \le (a+b) < 0.95$; further preferably $0.77 \le (a+b) \le 1.0$, particularly preferably $0.79 \le (a+b) < 0.93$, and ideally $0.80 \le (a+b) < 0.94$;

$0 \le c < 0.5$, preferably $0 < c \le 0.48$, further preferably $0.25 \le c \le 0.46$, and ideally $0.28 \le c \le 0.46$;

at least one of d and f is >0;

e>0;

$0 \le g < 0.5$;

$0 \le \delta \le 0.1$; preferably $\delta=0$;

wherein: a, b, c, d, e, f and g are chosen to maintain electro neutrality;

wherein the O3/P2 mixed phase sodium-containing doped layered oxide material comprises >0 to <100% of the first phase with an O3-type structure and <100 to >0% of the second phase with a P2-type structure, based on the combined total number of moles of the first and second phases present in the mixed-phase sodium-containing doped layered oxide material;

and wherein the O3/P2 mixed-phase sodium-containing doped layered oxide material of the present invention does not include a material with the formula $Na_{0.833}Ni_{0.317}Mn_{0.467}Mg_{0.100}Ti_{0.117}O_2$ comprising a mixture of phases in which a first phase has an O3-type structure and a second phase has a P2-type structure, wherein the amount of the first phase is 63% and the amount of the second phase is 37%, based on the combined total number of moles of the first and second phases present in the $Na_{0.833}Ni_{0.317}Mn_{0.467}Mg_{0.100}Ti_{0.117}O_2$ material, and does not include a material with the formula $Na_{0.95}Ni_{0.3167}Mn_{0.3167}Mg_{0.1583}Ti_{0.2083}O_2$ comprising a mixture of phases in which a first phase has an O3-type structure and a second phase has a P2-type structure, wherein the amount of the first phase is 97% and the amount of the second phase is 3%, based on the combined total number of moles of the first and second phases present in the $Na_{0.95}Ni_{0.3167}Mn_{0.3167}Mg_{0.1583}Ti_{0.2083}O_2$ material.

For the avoidance of doubt, the present invention includes materials of the formula $Na_{0.833}Ni_{0.317}Mn_{0.467}Mg_{0.100}Ti_{0.117}O_2$ that comprise an amount other than 63% of a first phase with an O3-type structure, and an amount other than 37% of a second phase with a P2-type structure; and also includes materials of the formula $Na_{0.95}Ni_{0.3167}Mn_{0.3167}Mg_{0.1583}Ti_{0.2083}O_2$ that comprise an amount other than 97% of a first phase with an O3-type structure, and an amount other than 3% of a second phase with a P2-type structure.

Preferably, the O3/P2 mixed phase sodium-containing doped layered oxide material according to the present invention comprises an amount of a P2-type phase which is within one or more of the ranges selected from >0%, >5%, >10%, >15%, >20%, >25%, >30%, >35%, >40%, >45%, >50%, >55%, >60%, >65%, >70%, >75%, >80%, >85%, >90%, >95% and <100% (with the exception of 37% when the O3/P2 mixed phase sodium-containing doped layered oxide material is of the formula $Na_{0.833}Ni_{0.317}Mn_{0.467}Mg_{0.100}Ti_{0.117}O_2$ and 3% when the O3/P2 mixed phase sodium-containing doped layered oxide material is of the formula $Na_{0.95}Ni_{0.3167}Mn_{0.3167}Mg_{0.1583}Ti_{0.2083}O_2$), based on the combined total number of moles of the O3-type and P2-type phases present in the O3/P2 mixed phase sodium-containing doped layered oxide material. Alternatively, or additionally in any combination with one or more of the aforementioned percentages for the amount of P2-type phase present in the O3/P2 mixed phase sodium-containing doped layered oxide material, the amount of P2-type phase is present within one or more of the ranges selected from <100%, <95%, <90%, <85%, <80%, <75%, <70%, <65%, <60%, <55%, <50%, <45%, <40%, <35%, <30%, <25%, <20%, <15%, <10%, <5%, >0% (with the exception of 37% when the O3/P2 mixed phase sodium-containing doped layered oxide material is of the formula $Na_{0.833}Ni_{0.317}Mn_{0.467}Mg_{0.100}Ti_{0.117}O_2$ and 3% when the O3/P2 mixed phase sodium-containing doped layered oxide material is of the formula $Na_{0.95}Ni_{0.3167}Mn_{0.3167}Mg_{0.1583}Ti_{0.2083}O_2$) based on the combined total number of moles of the O3-type phase and the P2-type phase present in the O3/P2 mixed phase sodium-containing doped layered oxide material. The amount of O3-type phase present is clearly inferred from the amount of P2-type phase since the amount of O3-type phase plus the amount of P2-type phase is normalised to equal 100% (as discussed below).

Further preferably, the O3/P2 mixed phase sodium-containing doped layered oxide material according to the present invention comprises 51% to 99%, but not 63% or 97%; preferably 51% to <63% and >63% to <97, and >97 to 99%; further preferably 51 to 62% and 64% to 96% and 98% to 99%, of the first phase with an O3-type structure (when the O3/P2 mixed phase sodium-containing doped layered oxide material is of the formula $Na_{0.833}Ni_{0.317}Mn_{0.467}Mg_{0.100}Ti_{0.117}O_2$) and 1 to 49%, but not 3% or 37%; preferably 1 to <3% and >3% to <37% and >37 to 49%; further preferably 1% to 2% and 4% to 36% and 38% to 49%, of the second phase with a P2-type structure when the O3/P2 mixed phase sodium-containing doped layered oxide material is of the formula $Na_{0.95}Ni_{0.3167}Mn_{0.3167}Mg_{0.1583}Ti_{0.2083}O_2$), based on the combined total number of moles of the O3-type and the P2-type phases present in the O3/P2 mixed phase sodium-containing doped layered oxide material.

Preferably $M^1$ is one or more metals with an oxidation state of 2+;

$M^2$ is one or more metals with an oxidation state of 4+;

$M^3$ is one or more metals with an oxidation state of 2+;

$M^4$ is one or more metals with an oxidation state of 4+; and $M^5$ is one or more metals with an oxidation state of 3+.

In a preferred O3/P2 mixed-phase sodium-containing doped layered oxide material according to the present invention, $M^1$ comprises or consists of one or more metals in oxidation state 2+ selected from nickel, iron, manganese, cobalt, copper, magnesium, calcium and zinc; $M^2$ comprises or consists of one or more metals in oxidation state 4+ selected from manganese, titanium and zirconium; $M^3$ comprises or consists of one or more metals in oxidation state 2+ selected from magnesium, calcium, copper, zinc and cobalt; $M^4$ comprises or consists of one or more metals in oxidation state 4+ selected from manganese, titanium and zirconium; and $M^5$ comprises or consists of one or more metals in oxidation state 3+ selected from aluminium, iron, cobalt, molybdenum, chromium, vanadium, scandium and yttrium. It is especially preferred that $M^1$ comprises or consists of nickel in oxidation state 2+.

Metals $M^2$ and $M^4$ may be the same or different metal(s) in oxidation state 4+. Moreover $M^2$ and $M^4$ may be interchangeable with each other. When $M^2=M^4$, the O3/P2 mixed-phase sodium-containing doped layered oxide material of the present invention may be written as:

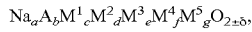

or

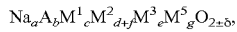

or

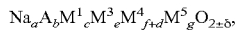

and all of these forms of the equation are to be regarded as equivalent.

When b=0, the O3/P2 mixed phase sodium-containing doped layered oxide materials do not contain any lithium or potassium, that is, the material contains sodium as the only alkali metal.

When a>b, the O3/P2 mixed phase sodium-containing doped layered oxide materials contain either i) sodium alone, or ii) a mixture of sodium and one or more further alkali metals selected from lithium and potassium, wherein the amount of sodium is greater than the amount of the further alkali metal, or, where more than one further alkali metal is present, the amount of sodium is greater than the combined amount of the more than one further alkali metals.

The percentage values for the first and second phases as referred to herein are calculated as a percentage of the total number of moles of the first phase with an O3-type structure plus the second phase with a P2-type structure, which are present in the O3/P2 mixed phase sodium-containing doped layered oxide material. The calculation is solely based on the amount of O3 phase material relative to the amount of P2 phase material that is present in the O3/P2 mixed phase sodium-containing doped layered oxide materials of the present invention. That is, it is assumed that O3+P2 is normalised to 100% and that the presence and amount of any impurity is disregarded for the purposes of this calculation.

As referred to herein, an impurity is defined to be any material that does not have an O3- or a P2-type phase structure, for example nickel oxide (NiO) is a common impurity that can form when making doped layered oxide materials, often when using a solid state reaction process.

The terms "O3-type phase" and "O3 phase" referred to herein are to be regarded as equivalent with each other and are used interchangeably, similarly P2-type phase and P2 phase referred to herein, are to be regarded as equivalent to one another and used interchangeably. Moreover, the terms "O3 phase" or "O3-type phase" will include one or more similar O3 phases such as secondary O3 phases and distorted O3 phases, the latter is often referred to by those skilled in the art as O3'phases, and the terms "P2 phase" or "P2-type phase" will include one or more similar P2 phases such as secondary P2 phases and distorted P2 phases, the latter is often referred to as P2' phases. It is possible for two or more O3- (or P2-) type phases to coexist, and typically these will occur as a result of the particular target composition and the process used to make it.

Ideally, quantitative phase analysis to determine the molar ratio of the O3/P2 phases in the O3/P2 mixed phase sodium-containing doped layered oxide materials according to the present invention, is performed by subjecting the structure parameters from the X-ray diffraction data to a technique known in the art as "Rietveld refinement analysis". Invented by Hugo Rietveld, Whole Pattern Fitting Structure Refinement is now widely accepted to be an exceptionally valuable method for structural analysis of nearly all classes of crystalline materials, and it is especially useful to determine the composition of material that comprises a mixture of crystalline phases. It is a software approach that works by refining various metrics, including lattice parameters, peak width and shape, and preferred orientation, to derive a calculated diffraction pattern. This derived pattern is then refined until it is as close as possible to the unknown composition being tested. Various properties pertaining to the test composition can be obtained including: accurate quantitative information, crystallite size, and site occupancy factors. Rietveld analysis has the advantage, over conventional quantitative methods, in that no standard materials are required and it is possible to achieve accurate results to within ±1%.

Preferably, the O3/P2 mixed phase sodium-containing doped layered oxide materials of the present invention include $M^1$ which comprises one or more metals in oxidation state 2+, selected from nickel, iron, manganese, cobalt, copper, magnesium, calcium and zinc. It is particularly preferred that the O3/P2 mixed phase sodium-containing doped layered oxide materials of the present invention include $M^1$ which comprises or consists of one or more metals in oxidation state 2+, selected from nickel, iron, cobalt and calcium. O3/P2 mixed phase sodium-containing doped layered nickelate materials are especially preferred.

Further preferably, the O3/P2 mixed phase sodium-containing doped layered oxide material of the present invention is selected from:

$NaNi_{0.400}Mn_{0.490}Mg_{0.100}Ti_{0.010}O_2$ (comprising 1% to 99% of a first phase with an O3-type structure and 99% to 1% of a second phase with a P2-type structure);

$Na_{0.95}Ni_{0.3167}Mn_{0.3167}Mg_{0.1583}Ti_{0.2083}O_2$ (comprising 1% to 99%, but not 97%, of a first phase with an O3-type structure and 99% to 1%, but not 3%, of a second phase with a P2-type structure);

$Na_{0.925}Ni_{0.4525}Mn_{0.5275}Mg_{0.01}Ti_{0.01}O_2$ (comprising 1% to 99% of a first phase with an O3-type structure and 99% to 1% of a second phase with a P2-type structure);

$Na_{0.867}Ni_{0.383}Mn_{0.467}Mg_{0.05}Ti_{0.1}O_2$ (comprising 1% to 99 of a first phase with an O3-type structure and 99% to 1% of a second phase with a P2-type structure);

$Na_{0.833}Ni_{0.317}Mn_{0.467}Mg_{0.1}Ti_{0.117}O_2$ (comprising 1% to 99%, but not 63%, of a first phase with an O3-type structure and 99% to 1%, but not 37%, of a second phase with a P2-type structure);

$Na_{0.8}Ni_{0.35}Mn_{0.48}Mg_{0.05}Ti_{0.12}O_2$ (comprising 1% to 99% of a first phase with an O3-type structure and 99% to 1% of a second phase with a P2-type structure);

$Na_{0.77}Ni_{0.28}Mn_{0.31}Mg_{0.05}Ti_{0.25}Fe_{0.11}O_2$ (comprising 1% to 99% of a first phase with an O3-type structure and 99% to 1% of a second phase with a P2-type structure);

$Na_{0.77}Ni_{0.225}Mn_{0.115}Mg_{0.01}Ti_{0.35}Fe_{0.3}O_2$ (comprising 1% to 99% of a first phase with an O3-type structure and 99% to 1% of a second phase with a P2-type structure);

$Na_{0.867}Ni_{0.333}Mn_{0.467}Mg_{0.1}Ti_{0.1}O_2$ (comprising 1% to 99% of a first phase with an O3-type structure and 99% to 1% of a second phase with a P2-type structure);

$Na_{0.833}Ni_{0.317}Mn_{0.417}Mg_{0.05}Ti_{0.117}Co_{0.1}O_2$ (comprising 1% to 99% of a first phase with an O3-type structure and 99% to 1% of a second phase with a P2-type structure);

$Na_{0.867}Ni_{0.383}Mn_{0.467}Mg_{0.05}Ti_{0.1}O_2$ (comprising 1% to 99% of a first phase with an O3-type structure and 99% to 1% of a second phase with a P2-type structure);

$Na_{0.85}Ni_{0.325}Mn_{0.525}Mg_{0.100}Ti_{0.05}O_2$ (comprising 1% to 99% of a first phase with an O3-type structure and 99% to 1% of a second phase with a P2-type structure);

$Na_{0.85}Ni_{0.325}Mn_{0.499}Mg_{0.100}Ti_{0.076}O_2$ (comprising 1% to 99% of a first phase with an O3-type structure and 99% to 1% of a second phase with a P2-type structure);

$Na_{0.77}Ni_{0.305}Mn_{0.51}Mg_{0.025}Ti_{0.05}Al_{0.055}Co_{0.055}O_2$ (comprising 1% to 99% of a first phase with an O3-type structure and 99% to 1% of a second phase with a P2-type structure;

$Na_{0.77}Ni_{0.305}Mn_{0.535}Mg_{0.025}Ti_{0.025}Al_{0.055}Co_{0.055}O_2$ (comprising 1% to 99% of a first phase with an O3-type structure and 99% to 1% of a second phase with a P2-type structure;

$NaNi_{0.4}Mn_{0.49}Mg_{0.1}Ti_{0.01}O_2$ (comprising 1% to 99% of a first phase with an O3-type structure and 99% to 1% of a second phase with a P2-type structure);

$Na_{0.77}Ni_{0.28}Mn_{0.51}Mg_{0.05}Ti_{0.05}Al_{0.055}Co_{0.055}O_2$ (comprising 1% to 99% of a first phase with an O3-type structure and 99% to 1% of a second phase with a P2-type structure);

$Na_{0.833}Fe_{0.200}Mn_{0.483}Mg_{0.0917}Cu_{0.225}O_2$ (comprising 1% to 99% of a first phase with an O3-type structure and 99% to 1% of a second phase with a P2-type structure);

$NaLi_{0.05}Ni_{0.3}Mn_{0.525}Mg_{0.025}Cu_{0.1}O_2$ (comprising 1% to 99% of a first phase with an O3-type structure and 99% to 1% of a second phase with a P2-type structure);

$Na_{0.775}Ni_{0.35}Mn_{0.475}Ti_{0.1}Al_{0.075}O_2$ (comprising 1% to 99% of a first phase with an O3-type structure and 99% to 1% of a second phase with a P2-type structure); and $Na_{0.833}Ca_{0.05}Ni_{0.3417}Mn_{0.4417}Mg_{0.125}Ti_{0.0917}O_2$ (comprising 1% to 99% of a first phase with an O3-type structure and 99% to 1% of a second phase with a P2-type structure).

As described above, the percentage values for each of the first and second phases are based on the combined total number of moles of the first phase with an O3-type structure and the second phase with a P2-type structure, which are present in the O3/P2 mixed phase sodium-containing doped layered oxide material.

Preferably the present invention provides an O3-rich O3/P2 mixed phase sodium-containing doped layered oxide material with the above-described general structure that comprises a mixture of phases in which a first phase has an O3-type structure and a second phase has a P2-type structure, wherein the amount of the first phase is 51 to 99% (but not including 63% when the O3/P2 mixed phase sodium-containing doped layered oxide material is of the formula $Na_{0.833}Ni_{0.317}Mn_{0.467}Mg_{0.100}Ti_{0.117}O_2$, or 97% when the O3/P2 mixed phase sodium-containing doped layered oxide material is of the formula $Na_{0.95}Ni_{0.3167}Mn_{0.3167}Mg_{0.1583}Ti_{0.2083}O_2$) and the amount of the second phase is 1 to 49% (but not including 37% when the O3/P2 mixed phase sodium-containing doped layered oxide material is of the formula $Na_{0.833}Ni_{0.317}Mn_{0.467}Mg_{0.100}Ti_{0.117}O_2$, or 3% when the O3/P2 mixed phase sodium-containing doped layered oxide material is of the formula $Na_{0.95}Ni_{0.3167}Mn_{0.3167}Mg_{0.1583}Ti_{0.2083}O_2$) based on the combined total number of moles of the first and second phases present in the O3/P2 mixed-phase sodium-containing doped layered oxide material. Alternatively preferably, the present invention provides a P2-rich O3/P2 mixed phase sodium-containing doped layered oxide material with the above-described general structure that comprises a mixture of phases in which a first phase has an O3-type structure and a second phase has a P2-type structure, wherein the amount of the first phase is 1 to 49% and the amount of the second phase is 51 to 99%, based on the combined total number of moles of the first and second phases present in the O3/P2 mixed-phase sodium-containing doped layered oxide material.

Contrary to the disclosure in the prior art which teaches a mixed phase sodium-containing doped layered oxide material with an average composition that is calculated from the proportions of the starting materials, the present applicant has unexpectedly found that a range of different O3/P2 phase ratios can be produced for each sodium-containing doped layered oxide material, and this is regardless of the composition of this material (for example amount of alkali metal and/or nickel present). Further unexpectedly, the present applicant has discovered that a range of different O3/P2 phase ratios can be obtained for a single target sodium-containing doped layered oxide material composition by modifying the process conditions used to prepare this target sodium-containing doped layered oxide material, specifically by altering the heating temperature and/or the duration of heating. As a general principle, the present applicant has found that the proportion of the phase with an O3 structure in any particular target sodium-containing doped layered oxide material increases, relative to the proportion of the phase with a P2 structure, when the heating temperature of the reaction process (the reaction temperature) is increased stepwise from 500° C. They have also found, additionally or alternatively, that increasing the reaction time also increases the proportion of the phase with an O3 structure relative to the proportion of the phase with a P2 structure in any particular target sodium-containing doped layered oxide material. As defined herein, the reaction time is the duration the reaction mixture is heated at the desired reaction temperature. Specific examples demonstrating these phenomena are presented below.

Each of the O3/P2 mixed phase sodium-containing doped layered oxide materials according to the present invention will have a chemical formula which falls within the general formula described above, and each of these O3/P2 mixed phase sodium-containing doped layered oxide materials are able to be conveniently synthesized by reacting together precursor materials in the amounts needed to provide the stoichiometric ratios of metal atoms that are present in the particular O3/P2 mixed phase sodium-containing doped layered oxide material being synthesized (the latter is also referred to herein as the "target" O3/P2 mixed phase sodium-containing doped layered oxide material). The target O3/P2 mixed phase sodium-containing doped layered oxide material will comprise a mixture of phases in which a first phase will have an O3-type structure and a second phase will have a P2-type structure, wherein the target O3/P2 mixed phase sodium-containing doped layered oxide contains 1 to 99% of a first phase (but not 63% when the target O3/P2 mixed phase sodium-containing doped layered oxide is of the formula $Na_{0.833}Ni_{0.317}Mn_{0.467}Mg_{0.100}Ti_{0.117}O_2$ or 97% when the target O3/P2 mixed phase sodium-containing doped layered oxide is of the formula $Na_{0.95}Ni_{0.3167}Mn_{0.3167}Mg_{0.1583}Ti_{0.2083}O_2$) and 99 to 1% of a second phase (but not 37% when the target O3/P2 mixed phase sodium-containing doped layered oxide is of the formula $Na_{0.833}Ni_{0.317}Mn_{0.467}Mg_{0.100}Ti_{0.117}O_2$ or 3% when the target O3/P2 mixed phase sodium-containing doped layered oxide is of the formula $Na_{0.05}Ni_{0.3167}Mn_{0.3167}Mg_{0.1583}Ti_{0.2083}O_2$), based on the combined total number of moles of the first and second phases present in the target O3/P2 mixed phase sodium-containing doped layered oxide material.

Thus, the invention also provides a process for making an O3/P2 mixed phase sodium-containing doped layered oxide material as described above, which has the general formula:

$$Na_aA_bM^1_cM^2_dM^3_eM^4_fM^5_gO_{2\pm\delta};$$

wherein:
A is an alkali metal selected from at least one of lithium and potassium;
$M^1$ is one or more metals with an average oxidation state of 2+;
$M^2$ is one or more metals with an average oxidation state of 4+;
$M^3$ is one or more metals with an average oxidation state of 2+;
$M^4$ is one or more metals with an average oxidation state of 4+; and
$M^5$ is one or more metals with an average oxidation state of 3+
wherein:
a>0;
a>b, preferably b=0;
0.75≤(a+b)≤1.0; preferably 0.75≤(a+b)<0.95; further preferably 0.77≤(a+b)≤1.0, particularly preferably 0.79≤(a+b)<0.93, and ideally 0.80≤(a+b)<0.94;
0≤c<0.5, preferably 0<c≤0.48, further preferably 0.25≤c≤0.46, and ideally 0.28≤c≤0.46;
at least one of d and f is >0;
e>0;
0≤g<0.5;
0≤δ≤0.1; preferably δ=0;
wherein: a, b, f and g are chosen to maintain electro neutrality;
wherein the O3/P2 mixed phase sodium-containing doped layered oxide material comprises a mixture of phases in which a first phase has an O3-type structure and a second phase has a P2-type structure;
wherein the amount of the first phase is 1 to 99% and the amount of the second phase is 99 to 1%, based on the combined total number of moles of the first and second phases present in the target O3/P2 mixed-phase sodium-containing doped layered oxide material, comprising the steps:
  i) forming a mixture of precursor materials to provide metal atoms in the stoichiometric ratios that are present in the target O3/P2 mixed-phase sodium-containing doped layered oxide material; and
  ii) heating the resulting mixture at a temperature of at least 500° C. to yield the target O3/P2 mixed-phase sodium-containing doped layered oxide material;
  and wherein the process does not involve either:
    i) forming a mixture of precursor materials which provide metal atoms in the stoichiometric ratios that are present in an O3/P2 mixed-phase sodium-containing doped layered oxide material with the formula $Na_{0.833}Ni_{0.317}Mn_{0.467}Mg_{0.100}Ti_{0.117}O_2$, and
    ii) heating the resulting mixture at 900° C. for 10 hours to produce a O3/P2 mixed-phase sodium-containing doped layered oxide material which comprises a mixture of phases in which a first phase has an O3-type structure and a second phase has a P2-type structure,
wherein the amount of the first phase is 63% and the amount of the second phase is 37%, based on the combined total number of moles of the first and second phases present in the O3/P2 mixed-phase sodium-containing doped layered oxide material;
or
  i) forming a mixture of precursor materials which provide metal atoms in the stoichiometric ratios that are present in an O3/P2 mixed-phase sodium-containing doped layered oxide material with the formula $Na_{0.95}Ni_{0.3167}Mn_{0.3167}Mg_{0.1583}Ti_{0.2083}O_2$ and
  ii) heating the resulting mixture at 900° C. for 4 minutes to produce a O3/P2 mixed-phase sodium-containing doped layered oxide material which comprises a mixture of phases in which a first phase has an O3-type structure and a second phase has a P2-type structure,
wherein the amount of the first phase is 97% and the amount of the second phase is 3%, based on the combined total number of moles of the first and second phases present in the O3/P2 mixed-phase sodium-containing doped layered oxide material.

As above, preferably, $M^1$ is one or more metals with an oxidation state of 2+;
$M^2$ is one or more metals with an oxidation state of 4+;
$M^3$ is one or more metals with an oxidation state of 2+;
$M^4$ is one or more metals with an oxidation state of 4+; and
$M^5$ is one or more metals with an oxidation state of 3+.

The present invention advantageously provides a process for making a target O3/P2 mixed phase sodium-containing doped layered oxide material as described above which comprises 51% to 99% of the first phase with an O3-type structure (but not 63% % when the target O3/P2 mixed phase sodium-containing doped layered oxide is of the formula $Na_{0.833}Ni_{0.317}Mn_{0.467}Mg_{0.100}Ti_{0.117}O_2$ or 97% when the target O3/P2 mixed phase sodium-containing doped layered oxide is of the formula $Na_{0.95}Ni_{0.3167}Mn_{0.3167}Mg_{0.1583}Ti_{0.2083}O_2$); preferably 51% to <63% and >63% to <97 and >97 to 99%; further preferably 51 to 62% and 64% to 96% and 98% to 99%. And 1 to 49% of the second phase with a P2-type structure (but not 37% when the target O3/P2 mixed phase sodium-containing doped layered oxide is of the formula $Na_{0.833}Ni_{0.317}Mn_{0.467}Mg_{0.100}Ti_{0.117}O_2$, or 3% when the target O3/P2 mixed phase sodium-containing doped layered oxide is of the formula $Na_{0.95}Ni_{0.3167}Mn_{0.3167}Mg_{0.1583}Ti_{0.2083}O_2$), preferably 1 to <3% and >3% to <37% and >37 to 49%; further preferably 1% to 2% and 4% to 36% and 38% to 49%, based on the combined total number of moles of the O3-type phase and the P2-type phase present in the O3/P2 mixed phase sodium-containing doped layered oxide material;
comprising the steps:
  i) forming a mixture of precursor materials to provide metal atoms in the stoichiometric ratios that are present in the target O3/P2 mixed-phase sodium-containing doped layered oxide material; and
  ii) heating the resulting mixture to a temperature of at least 500° C. to yield the target O3/P2 mixed-phase sodium-containing doped layered oxide material.

The present invention provides a further process for making an O3/P2 mixed-phase sodium-containing doped layered oxide material as described above and of the general formula:

$$Na_aA_bM^1_cM^2_dM^3_eM^4_fM^5_gO_{2\pm\delta};$$

wherein:
A is an alkali metal selected from at least one of lithium and potassium;

$M^1$ is one or more metals with an average oxidation state of 2+;

$M^2$ is one or more metals with an average oxidation state of 4+;

$M^3$ is one or more metals with an average oxidation state of 2+;

$M^4$ is one or more metals with an average oxidation state of 4+; and $M^5$ is one or more metals with an average oxidation state of 3+ wherein:

a>0;

a>b, preferably b=0;

0.75≤(a+b)≤1.0; preferably 0.75≤(a+b)<0.95; further preferably 0.77≤(a+b)≤1.0, particularly preferably 0.79≤(a+b)<0.93, and ideally 0.80≤(a+b)<0.94;

0≤c<0.5, preferably 0<c≤0.48, further preferably 0.25≤c≤0.46, and ideally 0.28≤c≤0.46;

at least one of d and f is >0;

e>0;

0≤g<0.5;

0≤δ≤0.1; preferably δ=0;

wherein: a, b, c, d, e, f and g are chosen to maintain electro neutrality;

and wherein the O3/P2 mixed-phase sodium-containing doped layered oxide material contains 1 to 99% of a first phase with an O3-type phase structure, and 99 to 1% of a second phase with a P2-type phase structure, based on the combined total number of moles of the first and second phases present in the target O3/P2 mixed-phase sodium-containing material, comprising the steps:

i) forming a mixture of precursor materials to provide the metal atoms in the stoichiometric ratios that are present in the target O3/P2 mixed-phase sodium-containing doped layered oxide material; and ii) heating the resulting mixture at a temperature of at least 500° C. for a period of time in the range greater than 4 minutes to less than 10 hours, to yield the target O3/P2 mixed-phase sodium-containing doped layered oxide material.

The abovementioned process of the present invention produces target materials, as defined above, in which $M^1$ comprises or consists of one or more metals in oxidation state 2+ selected from nickel, iron, manganese, cobalt, copper, magnesium, calcium and zinc; $M^2$ comprises or consists of one or more metals in oxidation state 4+ selected from manganese, titanium and zirconium; $M^3$ comprises or consists of one or more metals in oxidation state 2+ selected from magnesium, calcium, copper, zinc and cobalt; $M^4$ comprises or consists of one or more metals in oxidation state 4+ selected from manganese, titanium and zirconium; and $M^5$ comprises or consists of one or more metals in oxidation state 3+ selected from aluminium, iron, cobalt, molybdenum, chromium, vanadium, scandium and yttrium. Preferably, in the process of the present invention the target O3/P2 mixed phase sodium-containing doped layered oxide materials include $M^1$ which comprises one or more metals in oxidation state 2+, selected from nickel, iron, manganese, cobalt, copper, magnesium, calcium and zinc. It is particularly preferred that the target O3/P2 mixed phase sodium-containing doped layered oxide materials include $M^1$ which comprises or consists of one or more metals in oxidation state 2+, selected from nickel, iron, cobalt and calcium. Target O3/P2 mixed phase sodium-containing doped layered nickelate materials are especially preferred.

Ideally, the process of the present invention provides an O3/P2 mixed phase sodium-containing doped layered oxide material with the above-described general structure that comprises 51 to 99% of a first phase with an O3-type structure (but not 63% when the target O3/P2 mixed phase sodium-containing doped layered oxide is of the formula $Na_{0.833}Ni_{0.317}Mn_{0.467}Mg_{0.100}Ti_{0.117}O_2$ or 97% when the target O3/P2 mixed phase sodium-containing doped layered oxide is of the formula $Na_{0.95}Ni_{0.3167}Mn_{0.3167}Mg_{0.1583}Ti_{0.2083}O_2$), and 1 to 49% of a second phase with a P2-type structure (but not 37% when the target O3/P2 mixed phase sodium-containing doped layered oxide is of the formula $Na_{0.833}Ni_{0.317}Mn_{0.467}Mg_{0.100}Ti_{0.117}O_2$ or 3% when the target O3/P2 mixed phase sodium-containing doped layered oxide is of the formula $Na_{0.95}Ni_{0.3167}Mn_{0.3167}Mg_{0.1583}Ti_{0.2083}O_2$), based on the combined total number of moles of the first and second phases present in the O3/P2 mixed-phase sodium-containing doped layered oxide material.

Preferably the process of the present invention provides an O3-rich O3/P2 mixed phase sodium-containing doped layered oxide material with the above-described general structure that comprises a mixture of phases in which a first phase has an O3-type structure and a second phase has a P2-type structure, wherein the amount of the first phase is 51 to 99% (but not 63% when the target O3/P2 mixed phase sodium-containing doped layered oxide is of the formula $Na_{0.833}Ni_{0.317}Mn_{0.467}Mg_{0.100}Ti_{0.117}O_2$ or 97% when the target O3/P2 mixed phase sodium-containing doped layered oxide is of the formula $Na_{0.95}Ni_{0.3167}Mn_{0.3167}Mg_{0.1583}Ti_{0.2083}O_2$) and the amount of the second phase is 1 to 49% (but not 37% when the target O3/P2 mixed phase sodium-containing doped layered oxide is of the formula $Na_{0.833}Ni_{0.317}Mn_{0.467}Mg_{0.100}Ti_{0.117}O_2$ or 3% when the target O3/P2 mixed phase sodium-containing doped layered oxide is of the formula $Na_{0.95}Ni_{0.3167}Mn_{0.3167}Mg_{0.1583}Ti_{0.2083}O_2$) based on the combined total number of moles of the first and second phases present in the O3/P2 mixed-phase sodium-containing doped layered oxide material.

Alternatively preferably, the process of the present invention provides a P2-rich O3/P2 mixed phase sodium-containing doped layered oxide material with the above-described general structure that comprises a mixture of phases in which a first phase has an O3-type structure and a second phase has a P2-type structure, wherein the amount of the first phase is 1 to 49% and the amount of the second phase is 51 to 99%, based on the combined total number of moles of the first and second phases present in the O3/P2 mixed-phase sodium-containing doped layered oxide material.

Further preferably, the process of the present invention provides an O3/P2 mixed phase sodium-containing doped layered oxide material as described above which comprises an amount of P2-type phase which is within one or more of the ranges selected from >0%, >5%, >10%, >15%, >20%, >25%, >30%, >35%, >40%, >45%, >50%, >55%, >60%, >65%, >70%, >75%, >80%, >85%, >90%, >95% and <100% (with the exception of 37% when the target O3/P2 mixed phase sodium-containing doped layered oxide is of the formula $Na_{0.833}Ni_{0.317}Mn_{0.467}Mg_{0.100}Ti_{0.117}O_2$ or 3% when the target O3/P2 mixed phase sodium-containing doped layered oxide is of the formula $Na_{0.95}Ni_{0.3167}Mn_{0.3167}Mg_{0.1583}Ti_{0.2083}O_2$), based on the combined total number of moles of the O3-type phase and the P2-type phase present in the O3/P2 mixed phase sodium-containing doped layered oxide material. Additionally or alternatively, and in any combination with the aforementioned percentages for the amount of P2-type phase present in the O3/P2 mixed phase sodium-containing doped layered oxide material, the amount of P2-type phase is present within one or more of the ranges selected from <100%, <95%, <90%, <85%, <80%, <75%, <70%, <65%, <60%, <55%, <50%, <45%, <40%, <35%, <30%, <25%, <20%, <15%, <10%, <5%, >0% (with the exception of 37% when the target O3/P2 mixed phase sodium-containing doped layered oxide is of the formula $Na_{0.833}Ni_{0.317}Mn_{0.467}Mg_{0.100}Ti_{0.117}O_2$ or 3% when the target O3/P2 mixed phase sodium-containing doped layered oxide is of the formula $Na_{0.95}Ni_{0.3167}Mn_{0.3167}Mg_{0.1583}Ti_{0.2083}O_2$) based on the combined total number of moles of the O3-type phase and the P2-type phase present in the O3/P2 mixed phase sodium-containing doped layered oxide material. The amount of O3-type phase present is clearly inferred from the amount of P2-type phase since the amount of O3-type phase plus the amount of P2-type phase is normalised to equal 100% (as discussed above).

The reaction between the precursor materials generally occurs during the heating step ii) of the process, and this typically involves heating the mixture of precursor materials at a temperature, either at a single temperature, or over a range of temperatures, of at least 500° C., preferably at least 600° C., further preferably at least 700° C., yet further preferably at least 800° C., particularly preferably of at least 850° C., and ideally of at least 825° C. A maximum temperature is preferably 1200° C. and further preferably 1150° C. As mentioned above, the heating step does not involve heating at 900° C. for 10 hours when the mixture of precursor materials is selected to prepare an O3/P2 mixed phase sodium-containing doped layered oxide material with the formula $Na_{0.833}Ni_{0.317}Mn_{0.467}Mg_{0.100}Ti_{0.117}O_2$ comprising a mixture of phases in which a first phase has an O3-type structure and a second phase has a P2-type structure, and wherein the first and second phases are present in the ratio 63:37; and does not involve heating at 900° C. for 4 minutes when the mixture of precursor materials is selected to prepare an O3/P2 mixed phase sodium-containing doped layered oxide material with the formula $Na_{0.95}Ni_{0.3167}Mn_{0.3167}Mg_{0.1583}Ti_{0.2083}O_2$ comprising a mixture of phases in which a first phase has an O3-type structure and a second phase which has a P2-type structure, and wherein the first and second phases are present in the ratio 97:3.

Advantageously, the heating step ii) involves heating the mixture of precursor materials to the required reaction temperature, for a reaction time (as described above) of 30 seconds to 64 hours, preferably 30 seconds to 44 hours, further preferably 30 seconds to 20 hours, particularly preferably 1 minute to 12 hours, most preferably from greater than 4 minutes to less than 10 hours, and ideally between 8 to 12 hours. Commercial scale production is expected to require a reaction time of less than 8 hours, for example less than 1 hour.

All of the above O3/P2 mixed-phase sodium-containing doped materials according to the present invention, may be prepared according to the process of the present invention, as described above.

The precursor materials used in step i) of the process of the present invention may be selected from any suitable compound which contains one or more of the metal elements which are present in the target O3/P2 mixed-phase sodium-containing doped layered oxide material. Preferably the mixture of precursor materials comprises one or more compounds selected from $Na_2CO_3$, $NiCO_3$, $NiCO_3 \cdot 2Ni(OH)_2 \cdot xH_2O$, $MnO_2$, $MnO$, $MnCO_3$, $Mn_2O_3$, $Mg(OH)_2$, $TiO_2$, $Fe_2O_3$, $CoCO_3$, $Co_3O_4$, $Al(OH)_3$, $CuO$, $CaCO_3$, $ZnO$, $Cr_2O_3$, $MoO_3$, $MoO_2$, $V_2O_3$, $V_2O_5$, $Zr(OH)_4$, $Al(OH)_3$.

Ideally the process of the present invention is performed as a "solid-state" reaction i.e. a reaction in which all of the precursor materials (reactants) are in solid form and are substantially free of any reaction medium such as a solvent, however, in some cases a solution based reaction may also be used in which the mixture of precursor materials is formed by mixing, suspending or dissolving one or more of the precursor materials in a solvent, such as water.

The mixture of precursor materials preferably comprises at least two precursor materials which between them contain a combined total quantity of each metal atom that is equivalent to the stoichiometric ratios which are present in the target O3/P2 mixed-phase sodium-containing doped layered oxide material which has the general formula described above.

The precursor materials may be admixed (preferably intimately admixed) using any known method. Further preferably one or more of the precursor materials is in particulate form, and this may be achieved using various methods, for example by finely grinding one or more of the precursor materials separately using, for example, a pestle and mortar or a ball mill, and then optionally mixing two or more of the precursor materials together, using for example, a micronizer or a mixer mill. Alternatively, two or more precursor materials can be admixed whilst they are being finely ground. The grinding and/or admixing is preferably of sufficient duration to produce a finely ground, and/or uniformly intermixed, powder. To assist the grinding and/or admixing process, it is found useful to use a dispersant (preferably a material which is easily removed, such as a low boiling material, for example acetone) to assist the grinding and/or admixing process, although this dispersant will preferably be at least substantially removed prior to the heating step. Other known techniques such as high energy ball milling and microwave activation may also be used to help prepare the precursor materials, for example to increase their reactivity.

Typically the reaction is performed under atmospheric pressure, either in air or under a non-oxidising atmosphere, for example one or a mixture of nitrogen, argon or another inert gas, but it may also be performed under an air or gas pressure greater than atmospheric pressure, or under a vacuum.

The above-described process of the present invention advantageously provides a process for the preparation of O3/P2 mixed-phase sodium-containing doped layered oxide materials selected from:

$NaNi_{0.400}Mn_{0.490}Mg_{0.100}Ti_{0.010}O_2$ (comprising 1% to 99% of a first phase with an O3-type structure and 99% to 1% of a second phase with a P2-type structure);

$Na_{0.95}Ni_{0.3167}Mn_{0.3167}Mg_{0.1583}Ti_{0.2083}O_2$ (comprising 1% to 99%, but not 97%, of a first phase with an O3-type structure and 99% to 1%, but not 3%, of a second phase with a P2-type structure);

$Na_{0.925}Ni_{0.4525}Mn_{0.5275}Mg_{0.01}Ti_{0.01}O_2$ (comprising 1% to 99% of a first phase with an O3-type structure and 99% to 1% of a second phase with a P2-type structure);

$Na_{0.867}Ni_{0.383}Mn_{0.467}Mg_{0.05}Ti_{0.1}O_2$ (comprising 1% to 99 of a first phase with an O3-type structure and 99% to 1% of a second phase with a P2-type structure);

$Na_{0.833}Ni_{0.317}Mn_{0.467}Mg_{0.1}Ti_{0.117}O_2$ (comprising 1% to 99%, but not 63%, of a first phase with an O3-type structure and 99% to 1%, but not 37%, of a second phase with a P2-type structure);

Na$_{0.8}$Ni$_{0.35}$Mn$_{0.48}$Mg$_{0.05}$Ti$_{0.12}$O$_2$ (comprising 1% to 99% of a first phase with an O3-type structure and 99% to 1% of a second phase with a P2-type structure);

Na$_{0.77}$Ni$_{0.28}$Mn$_{0.31}$Mg$_{0.05}$Ti$_{0.25}$Fe$_{0.11}$O$_2$ (comprising 1% to 99% of a first phase with an O3-type structure and 99% to 1% of a second phase with a P2-type structure);

Na$_{0.77}$Ni$_{0.225}$Mn$_{0.115}$Mg$_{0.01}$Ti$_{0.35}$Fe$_{0.3}$O$_2$ (comprising 1% to 99% of a first phase with an O3-type structure and 99% to 1% of a second phase with a P2-type structure);

Na$_{0.867}$Ni$_{0.333}$Mn$_{0.467}$Mg$_{0.1}$Ti$_{0.1}$O$_2$ (comprising 1% to 99% of a first phase with an O3-type structure and 99% to 1% of a second phase with a P2-type structure);

Na$_{0.833}$Ni$_{0.317}$Mn$_{0.417}$Mg$_{0.08}$Ti$_{0.117}$Co$_{0.1}$O$_2$ (comprising 1% to 99% of a first phase with an O3-type structure and 99% to 1% of a second phase with a P2-type structure);

Na$_{0.867}$Ni$_{0.383}$Mn$_{0.467}$Mg$_{0.05}$Ti$_{0.1}$O$_2$ (comprising 1% to 99% of a first phase with an O3-type structure and 99% to 1% of a second phase with a P2-type structure);

Na$_{0.85}$Ni$_{0.325}$Mn$_{0.525}$Mg$_{0.100}$Ti$_{0.05}$O$_2$ (comprising 1% to 99% of a first phase with an O3-type structure and 99% to 1% of a second phase with a P2-type structure);

Na$_{0.85}$Ni$_{0.325}$Mn$_{0.499}$Mg$_{0.100}$Ti$_{0.076}$O$_2$ (comprising 1% to 99% of a first phase with an O3-type structure and 99% to 1% of a second phase with a P2-type structure);

Na$_{0.77}$Ni$_{0.305}$Mn$_{0.51}$Mg$_{0.025}$Ti$_{0.05}$Al$_{0.055}$Co$_{0.055}$O$_2$ (comprising 1% to 99% of a first phase with an O3-type structure and 99% to 1% of a second phase with a P2-type structure;

Na$_{0.77}$Ni$_{0.305}$Mn$_{0.535}$Mg$_{0.025}$Ti$_{0.025}$Al$_{0.055}$Co$_{0.055}$O$_2$ (comprising 1% to 99% of a first phase with an O3-type structure and 99% to 1% of a second phase with a P2-type structure;

NaNi$_{0.4}$Mn$_{0.49}$Mg$_{0.1}$Ti$_{0.01}$O$_2$ (comprising 1% to 99% of a first phase with an O3-type structure and 99% to 1% of a second phase with a P2-type structure);

Na$_{0.77}$Ni$_{0.28}$Mn$_{0.51}$Mg$_{0.05}$Ti$_{0.05}$Al$_{0.055}$Co$_{0.055}$O$_2$ (comprising 1% to 99% of a first phase with an O3-type structure and 99% to 1% of a second phase with a P2-type structure);

Na$_{0.833}$Fe$_{0.200}$Mn$_{0.483}$Mg$_{0.0917}$Cu$_{0.225}$O$_2$ (comprising 1% to 99% of a first phase with an O3-type structure and 99% to 1% of a second phase with a P2-type structure);

NaLi$_{0.05}$Ni$_{0.3}$Mn$_{0.525}$Mg$_{0.025}$Cu$_{0.1}$O$_2$ (comprising 1% to 99% of a first phase with an O3-type structure and 99% to 1% of a second phase with a P2-type structure);

Na$_{0.775}$Ni$_{0.35}$Mn$_{0.475}$Ti$_{0.1}$Al$_{0.075}$O$_2$ (comprising 1% to 99% of a first phase with an O3-type structure and 99% to 1% of a second phase with a P2-type structure); and Na$_{0.833}$Ca$_{0.05}$Ni$_{0.3417}$Mn$_{0.4417}$Mg$_{0.125}$Ti$_{0.0917}$O$_2$ (comprising 1% to 99% of a first phase with an O3-type structure and 99% to 1% of a second phase with a P2-type structure).

wherein the percentage values for each of the first and second phases are based on the combined total number of moles of the first and second phases present in the O3/P2 mixed phase sodium-containing doped layered oxide material.

The present invention also provides the use of O3/P2 mixed-phase sodium-containing doped layered oxide materials of the present invention as electrode active materials, preferably as cathode electrode active materials.

Further, the present invention provides an electrode, preferably a cathode electrode, comprising one or more O3/P2 mixed-phase sodium-containing doped layered oxide materials according to the present invention.

The most preferred electrodes of the present invention comprise one or more O3/P2 mixed-phase sodium-containing doped layered oxide materials selected from:

NaNi$_{0.400}$Mn$_{0.490}$Mg$_{0.100}$Ti$_{0.010}$O$_2$ (comprising 1% to 99% of a first phase with an O3-type structure and 99% to 1% of a second phase with a P2-type structure);

Na$_{0.95}$Ni$_{0.3167}$Mn$_{0.3167}$Mg$_{0.1583}$Ti$_{0.2083}$O$_2$ (comprising 1% to 99%, but not 97%, of a first phase with an O3-type structure and 99% to 1%, but not 3%, of a second phase with a P2-type structure);

Na$_{0.925}$Ni$_{0.4525}$Mn$_{0.5275}$Mg$_{0.01}$Ti$_{0.01}$O$_2$ (comprising 1% to 99% of a first phase with an O3-type structure and 99% to 1% of a second phase with a P2-type structure);

Na$_{0.867}$Ni$_{0.383}$Mn$_{0.467}$Mg$_{0.05}$Ti$_{0.1}$O$_2$ (comprising 1% to 99 of a first phase with an O3-type structure and 99% to 1% of a second phase with a P2-type structure);

Na$_{0.833}$Ni$_{0.317}$Mn$_{0.467}$Mg$_{0.1}$Ti$_{0.117}$O$_2$ (comprising 1% to 99%, but not 63%, of a first phase with an O3-type structure and 99% to 1%, but not 37%, of a second phase with a P2-type structure);

Na$_{0.8}$Ni$_{0.35}$Mn$_{0.48}$Mg$_{0.05}$Ti$_{0.12}$O$_2$ (comprising 1% to 99% of a first phase with an O3-type structure and 99% to 1% of a second phase with a P2-type structure);

Na$_{0.77}$Ni$_{0.28}$Mn$_{0.31}$Mg$_{0.05}$Ti$_{0.25}$Fe$_{0.11}$O$_2$ (comprising 1% to 99% of a first phase with an O3-type structure and 99% to 1% of a second phase with a P2-type structure);

Na$_{0.77}$Ni$_{0.225}$Mn$_{0.115}$Mg$_{0.01}$Ti$_{0.35}$Fe$_{0.3}$O$_2$ (comprising 1% to 99% of a first phase with an O3-type structure and 99% to 1% of a second phase with a P2-type structure);

Na$_{0.867}$Ni$_{0.333}$Mn$_{0.467}$Mg$_{0.1}$Ti$_{0.1}$O$_2$ (comprising 1% to 99% of a first phase with an O3-type structure and 99% to 1% of a second phase with a P2-type structure);

Na$_{0.833}$Ni$_{0.317}$Mn$_{0.417}$Mg$_{0.05}$Ti$_{0.117}$Co$_{0.1}$O$_2$ (comprising 1% to 99% of a first phase with an O3-type structure and 99% to 1% of a second phase with a P2-type structure);

Na$_{0.867}$Ni$_{0.383}$Mn$_{0.467}$Mg$_{0.05}$Ti$_{0.1}$O$_2$ (comprising 1% to 99% of a first phase with an O3-type structure and 99% to 1% of a second phase with a P2-type structure);

Na$_{0.85}$Ni$_{0.325}$Mn$_{0.525}$Mg$_{0.100}$Ti$_{0.05}$O$_2$ (comprising 1% to 99% of a first phase with an O3-type structure and 99% to 1% of a second phase with a P2-type structure);

Na$_{0.85}$Ni$_{0.325}$Mn$_{0.499}$Mg$_{0.100}$Ti$_{0.076}$O$_2$ (comprising 1% to 99% of a first phase with an O3-type structure and 99% to 1% of a second phase with a P2-type structure);

Na$_{0.77}$Ni$_{0.305}$Mn$_{0.51}$Mg$_{0.025}$Ti$_{0.05}$Al$_{0.055}$Co$_{0.055}$O$_2$ (comprising 1% to 99% of a first phase with an O3-type structure and 99% to 1% of a second phase with a P2-type structure;

Na$_{0.77}$Ni$_{0.305}$Mn$_{0.535}$Mg$_{0.025}$Ti$_{0.025}$Al$_{0.055}$Co$_{0.055}$O$_2$ (comprising 1% to 99% of a first phase with an O3-type structure and 99% to 1% of a second phase with a P2-type structure;

NaNi$_{0.4}$Mn$_{0.49}$Mg$_{0.1}$Ti$_{0.01}$O$_2$ (comprising 1% to 99% of a first phase with an O3-type structure and 99% to 1% of a second phase with a P2-type structure);

Na$_{0.77}$Ni$_{0.28}$Mn$_{0.51}$Mg$_{0.05}$Ti$_{0.05}$Al$_{0.055}$Co$_{0.055}$O$_2$ (comprising 1% to 99% of a first phase with an O3-type structure and 99% to 1% of a second phase with a P2-type structure);

Na$_{0.833}$Fe$_{0.200}$Mn$_{0.483}$Mg$_{0.0917}$Cu$_{0.225}$O$_2$ (comprising 1% to 99% of a first phase with an O3-type structure and 99% to 1% of a second phase with a P2-type structure);

NaLi$_{0.05}$Ni$_{0.3}$Mn$_{0.525}$Mg$_{0.025}$Cu$_{0.1}$O$_2$ (comprising 1% to 99% of a first phase with an O3-type structure and 99% to 1% of a second phase with a P2-type structure);

$Na_{0.775}Ni_{0.35}Mn_{0.475}Ti_{0.1}Al_{0.075}O_2$ (comprising 1% to 99% of a first phase with an O3-type structure and 99% to 1% of a second phase with a P2-type structure); and $Na_{0.833}Ca_{0.05}Ni_{0.3417}Mn_{0.4417}Mg_{0.125}Ti_{0.0917}O_2$ (comprising 1% to 99% of a first phase with an O3-type structure and 99% to 1% of a second phase with a P2-type structure).

wherein the percentage values for each of the first and second phases are based on the combined total number of moles of the first and second phases present in the O3/P2 mixed phase sodium-containing doped layered oxide material.

The electrodes of the present invention are suitable for use in many different applications including sodium-ion cells which may be widely used for example in energy storage devices, such as batteries, rechargeable batteries, electrochemical devices and electrochromic devices. Preferably the electrodes of the present invention may be used in conjunction with a counter electrode and one or more electrolyte materials. The electrolyte materials may be any suitable material including conventional, known or hitherto unknown materials.

Finally, the present invention provides energy storage devices such as batteries, rechargeable batteries, electrochemical devices and electrochromic devices that comprise an O3/P2 mixed-phase sodium-containing doped layered oxide (preferably nickelate) material as described above.

BRIEF DESCRIPTION OF THE DRAWINGS

The present invention will now be described with reference to the following figures in which.

DETAILED DESCRIPTION

Figure 1:
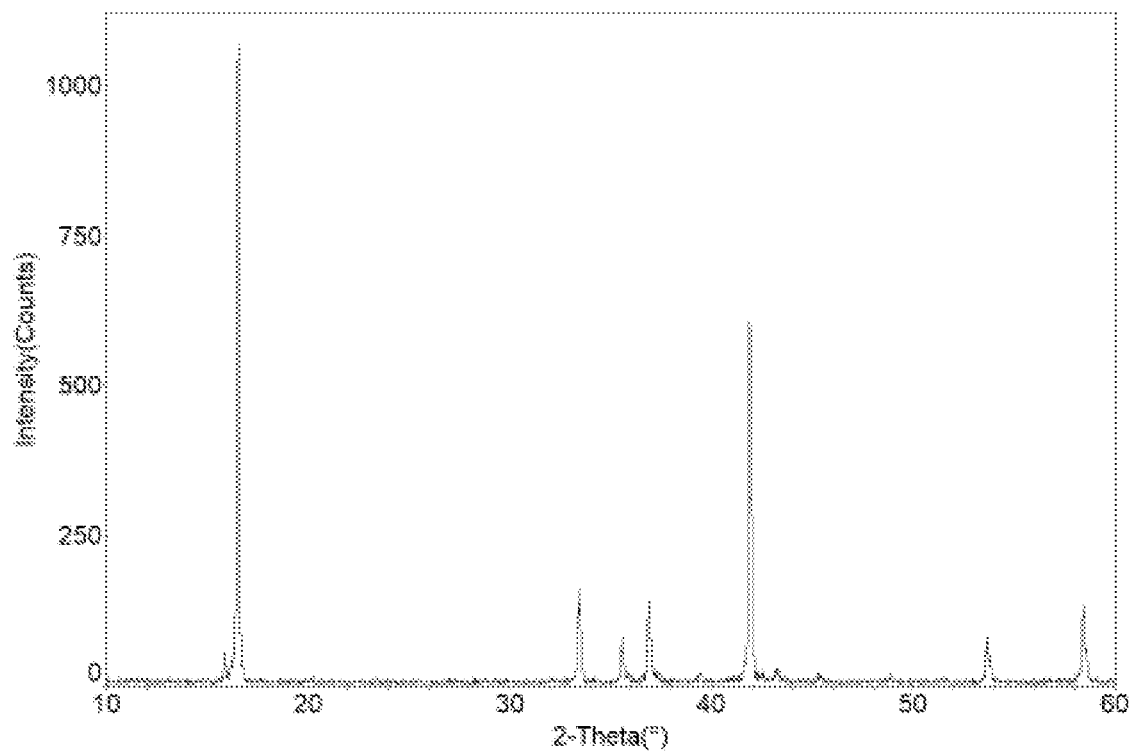
FIG. 1 is the XRD profile of the known material $NaNi_{0.5}Mn_{0.5}O_2$ (CE1)

General Method for Making O3/P2 Mixed Phase Sodium-Containing Doped Layered Oxide Materials of the Present Invention:

1) Mix together the precursor materials to provide the metal atoms in the stoichiometric ratios that are present in a target O3/P2 mixed phase sodium-containing doped layered oxide material of the above described general formula, and press the resulting precursor mixture into a pellet;
2) Heat the resulting pelletized precursor mixture in a furnace under a suitable atmosphere comprising for example ambient air, nitrogen or an inert atmosphere (e.g. argon) (the gases may be flowing but need not be so, and may be pure or a mixture), over a ramp time of 0 to 20 hours, until the pelletized mixture reaches the desired reaction temperature (this will be a temperature of at least 500° C.). The ramp rate used will be the rate of heating (° C./min) needed to ensure that the reactants are uniformly heated to the required reaction temperature in a reasonable time. A person skilled in this art will know that this will depend on the efficiency of the heating equipment used, whether or not a continuous feed furnace/kiln is employed, whether the equipment and/or the reactants are preheated and the batch size. Typical ramp rates are 2° C. to 20° C. per minute. Continue heating for a reaction time of from 30 seconds up to 64 hours until the target O3/P2 mixed phase sodium-containing doped layered oxide material forms; and
3) cool, optionally grind the target material to a powder.

Table 1 below lists the precursor materials and heating conditions used to prepare the O3/P2 mixed phase sodium-containing doped layered oxide materials.

TABLE 1

| Example No. (Sample No.) | Composition | Starting Materials | Furnace Conditions (reaction temperature (° C.), gas, Reaction time) | O3/P2 Content |
| --- | --- | --- | --- | --- |
| CE1 (X2895) | O3—$NaNi_{0.5}Mn_{0.5}O_2$ (comparative example) | 0.5 $Na_2CO_3$, 0.5 $NiCO_3$, 0.5 $MnO_2$ | 900° C., air, 8 hours | 100% O3 |
| CE2 (X2896) | O3—$NaNi_{0.5}Ti_{0.5}O_2$ (comparative example) | 0.5 $Na_2CO_3$, 0.5 $NiCO_3$, 0.5 $TiO_2$ | 900° C., air, 8 hours | 100% O3 |
| CE3 (X2748) | $Na_{0.667}Ni_{0.333}Mn_{0.667}O_2$ (comparative example) | 0.333 $Na_2CO_3$, 0.333 $NiCO_3$, 0.667 $MnO_2$ | 900° C., air, 8 hours | 100% P2 |
| Example 1 (X2883) [Na] = 0.80 | $Na_{0.8}Ni_{0.35}Mn_{0.48}Mg_{0.05}Ti_{0.12}O_2$ 1100° C. | 0.4 $Na_2CO_3$, 0.35 $NiCO_3$, 0.48 $MnO_2$, 0.05 $Mg(OH)_2$, 0.12 $TiO_2$ | 1100° C., air, 8 hours | 96% O3 4% P2 |
| Ex. 2 (X2505) [Na] = 0.867 | $Na_{0.867}Ni_{0.333}Mn_{0.467}Mg_{0.1}Ti_{0.1}O_2$ | 0.433 $Na_2CO_3$ 0.333 $NiCO_3$ 0.467 $MnO_2$ 0.1 $Mg(OH)_2$ 0.1 $TiO_2$ | 850° C., air, 8 hours | 78% O3 22% P2 |
| Ex. 3 (X2504) [Na] = 0.867 | $Na_{0.867}Ni_{0.333}Mn_{0.467}Mg_{0.1}Ti_{0.1}O_2$ | 0.433 $Na_2CO_3$ 0.333 $NiCO_3$ 0.467 $MnO_2$ 0.1 $Mg(OH)_2$ 0.1 $TiO_2$ | 800° C., air, 8 hours | 51% O3 49% P2 |
| Ex. 4 (X2506) [Na] = 0.867 | $Na_{0.867}Ni_{0.333}Mn_{0.467}Mg_{0.1}Ti_{0.1}O_2$ | 0.433 $Na_2CO_3$ 0.333 $NiCO_3$ 0.467 $MnO_2$ 0.1 $Mg(OH)_2$ 0.1 $TiO_2$ | 900° C., air, 8 hours | 90% O3 10% P2 |
| Ex. 5 (X2835) [Na] = 0.925 | $Na_{0.925}Ni_{0.453}Mn_{0.528}Mg_{0.01}Ti_{0.01}O_2$ | 0.4625 $Na_2CO_3$ 0.4525 $NiCO_3$ 0.5275 $MnO_2$ 0.01 $Mg(OH)_2$ 0.01 $TiO_2$ | 800° C., air, 64 hours | 73% O3 27% P2 |
| Ex. 6 (X2836) [Na] = 0.925 | $Na_{0.925}Ni_{0.453}Mn_{0.528}Mg_{0.01}Ti_{0.01}O_2$ | 0.4625 $Na_2CO_3$ 0.4525 $NiCO_3$ 0.5275 $MnO_2$ 0.01 $Mg(OH)_2$ 0.01 $TiO_2$ | 900° C., air, 8 hours | 95% O3 5% P2 |
| Ex. 7 (X2666) [Na] = 0.833 | $Na_{0.833}Ni_{0.317}Mn_{0.467}Mg_{0.1}Ti_{0.117}O_2$ | 0.4167 $Na_2CO_3$ 0.3167 $NiCO_3$ 0.4667 $MnO_2$ 0.1 $Mg(OH)_2$ 0.1167 $TiO_2$ | 900° C., air, 1 minute | 56% O3 44% P2 |
| Ex. 8 (X2663) [Na] = 0.833 | $Na_{0.833}Ni_{0.317}Mn_{0.467}Mg_{0.1}Ti_{0.117}O_2$ | 0.4167 $Na_2CO_3$ 0.3167 $NiCO_3$ 0.4667 $MnO_2$ 0.1 $Mg(OH)_2$ 0.1167 $TiO_2$ | 900° C., air, 30 minutes | 68% O3 32% P2 |
| Ex. 9 (X2799) [Na] = 0.833 | $Na_{0.833}Ni_{0.317}Mn_{0.467}Mg_{0.1}Ti_{0.117}O_2$ | 0.4167 $Na_2CO_3$ 0.3167 $NiCO_3$ 0.4667 $MnO_2$ 0.1 $Mg(OH)_2$ 0.1167 $TiO_2$ | 900° C., air, 8 hours | 71% O3 29% P2 |

TABLE 1-continued

| Example No. (Sample No.) | Composition | Starting Materials | Furnace Conditions (reaction temperature (° C.), gas, Reaction time) | O3/P2 Content |
|---|---|---|---|---|
| Ex. 10 (X2662) [Na] = 0.833 | $Na_{0.833}Ni_{0.317}Mn_{0.467}Mg_{0.1}Ti_{0.117}O_2$ | 0.4167 $Na_2CO_3$<br>0.3167 $NiCO_3$<br>0.4667 $MnO_2$<br>0.1 $Mg(OH)_2$<br>0.1167 $TiO_2$ | 900° C., air, 12 hours | 75% O3<br>25% P2 |
| Ex. 11 (X2512) | $Na_{0.833}Ni_{0.317}Mn_{0.417}Mg_{0.05}Ti_{0.117}Co_{0.1}O_2$ | 0.417 $Na_2CO_3$<br>0.317 $NiCO_3$<br>0.467 $MnO_2$<br>0.05 $Mg(OH)_2$<br>0.067 $TiO_2$<br>0.1 $CoCO_3$ | 900° C., air, 8 hours | 87% O3<br>13% P2 |
| Ex. 12 (X2519) | $Na_{0.833}Ni_{0.317}Mn_{0.417}Mg_{0.05}Ti_{0.117}Co_{0.1}O_2$ | 0.417 $Na_2CO_3$<br>0.317 $NiCO_3$<br>0.467 $MnO_2$<br>0.05 $Mg(OH)_2$<br>0.067 $TiO_2$<br>0.1 $CoCO_3$ | 850° C., air, 8 hours | 67% O3<br>33% P2 |
| Ex. 13 (X2520) | $Na_{0.833}Ni_{0.317}Mn_{0.417}Mg_{0.05}Ti_{0.117}Co_{0.1}O_2$ | 0.417 $Na_2CO_3$<br>0.317 $NiCO_3$<br>0.467 $MnO_2$<br>0.05 $Mg(OH)_2$<br>0.067 $TiO_2$<br>0.1 $CoCO_3$ | 800° C., air, 8 hours | 66% O3<br>34% P2 |
| Ex. 14 (X2878) | $Na_{0.8}Ni_{0.35}Mn_{0.48}Mg_{0.05}Ti_{0.12}O_2$ | 0.4 $Na_2CO_3$<br>0.35 $NiCO_3$<br>0.48 $MnO_2$<br>0.05 $Mg(OH)_2$<br>0.12 $TiO_2$ | 1000° C., air, 8 hours | 67% O3<br>33% P2 |
| Ex. 15 (X2888) | $Na_{0.77}Ni_{0.28}Mn_{0.31}Mg_{0.05}Ti_{0.25}Fe_{0.11}O_2$ | 0.385 $Na_2CO_3$<br>0.28 $NiCO_3$<br>0.31 $MnO_2$<br>0.05 $Mg(OH)_2$<br>0.25 $TiO_2$<br>0.055 $Fe_2O_3$ | 900° C., air, 1 hour | 76% O3,<br>24% P2 |
| Ex. 16 (X2893) | $Na_{0.77}Ni_{0.28}Mn_{0.31}Mg_{0.05}Ti_{0.25}Fe_{0.11}O_2$ | 0.385 $Na_2CO_3$<br>0.28 $NiCO_3$<br>0.31 $MnO_2$<br>0.05 $Mg(OH)_2$<br>0.25 $TiO_2$<br>0.055 $Fe_2O_3$ | 900° C., air, 8 hours | 72% O3,<br>28% P2 |
| Ex. 17 (X2890) | $Na_{0.85}Ni_{0.325}Mn_{0.499}Mg_{0.100}Ti_{0.076}O_2$ | 0.425 $Na_2CO_3$<br>0.325 $NiCO_3$<br>0.499 $MnO_2$<br>0.1 $Mg(OH)_2$<br>0.076 $TiO_2$ | 800° C., air, 8 hours | 65% O3,<br>35% P2 |
| Ex. 18 (X2891) | $Na_{0.85}Ni_{0.325}Mn_{0.525}Mg_{0.100}Ti_{0.05}O_2$ | 0.425 $Na_2CO_3$<br>0.325 $NiCO_3$<br>0.525 $MnO_2$<br>0.1 $Mg(OH)_2$<br>0.05 $TiO_2$ | 800° C., air, 8 hours | 77% O3,<br>23% P2 |
| Ex. 19 (X2717) | $Na_{0.77}Ni_{0.305}Mn_{0.51}Mg_{0.025}Ti_{0.05}Al_{0.055}Co_{0.055}O_2$ | 0.385 $Na_2CO_3$<br>0.305 $NiCO_3$<br>0.51 $MnO_2$<br>0.025 $Mg(OH)_2$<br>0.05 $TiO_2$<br>0.055 $Al(OH)_3$<br>0.055 $CoCO_3$ | 850° C., air, 8 hours | 11% O3,<br>89% P2 |
| Ex. 20 (X2718) | $Na_{0.77}Ni_{0.305}Mn_{0.51}Mg_{0.025}Ti_{0.05}Al_{0.055}Co_{0.055}O_2$ | 0.385 $Na_2CO_3$<br>0.305 $NiCO_3$<br>0.51 $MnO_2$<br>0.025 $Mg(OH)_2$<br>0.05 $TiO_2$<br>0.055 $Al(OH)_3$<br>0.055 $CoCO_3$ | 850° C., air, 8 hours | 5% O3,<br>95% P2 |
| Ex. 21 (X2892) | $NaNi_{0.400}Mn_{0.490}Mg_{0.1}Ti_{0.01}O_2$ | 0.5 $Na_2CO_3$<br>0.4 $NiCO_3$<br>0.49 $MnO_2$<br>0.1 $Mg(OH)_2$<br>0.01 $TiO_2$ | 800° C., air, 8 hours | 44% O3,<br>56% P2 |
| Ex. 22 X2712 | $Na_{0.77}Ni_{0.28}Mn0.51\,Mg_{0.05}Ti_{0.05}Al_{0.055}Co_{0.055}O_2$ | 0.385 $Na_2CO_3$<br>0.28 $NiCO_3$<br>0.51 $MnO_2$<br>0.05 $Mg(OH)_2$<br>0.05 $TiO_2$ | 850° C., air, 8 hours | 13% O3,<br>87% P2 |

TABLE 1-continued

| Example No. (Sample No.) | Composition | Starting Materials | Furnace Conditions (reaction temperature (° C.), gas, Reaction time) | O3/P2 Content |
|---|---|---|---|---|
| Ex. 23 X2670 | $Na_{0.77}Ni_{0.28}Mn_{0.51}Mg_{0.05}Ti_{0.05}Al_{0.055}Co_{0.055}O_2$ | 0.385 $Na_2CO_3$<br>0.28 $NiCO_3$<br>0.51 $MnO_2$<br>0.05 $Mg(OH)_2$<br>0.05 $TiO_2$<br>0.055 $Al(OH)_3$<br>0.055 $CoCO_3$ | 900° C., air, 8 hours | 14% O3, 86% P2 |
| Ex. 24 X2900 | $Na_{0.77}Ni_{0.28}Mn_{0.51}Mg_{0.05}Ti_{0.05}Al_{0.055}Co_{0.055}O_2$ | 0.385 $Na_2CO_3$<br>0.28 $NiCO_3$<br>0.51 $MnO_2$<br>0.05 $Mg(OH)_2$<br>0.05 $TiO_2$<br>0.055 $Al(OH)_3$<br>0.055 $CoCO_3$ | 950° C., air, 8 hours | 17% O3, 83% P2 |
| Ex. 25 X2901 | $Na_{0.77}Ni_{0.28}Mn_{0.51}Mg_{0.05}Ti_{0.05}Al_{0.055}Co_{0.055}O_2$ | 0.385 $Na_2CO_3$<br>0.28 $NiCO_3$<br>0.51 $MnO_2$<br>0.05 $Mg(OH)_2$<br>0.05 $TiO_2$<br>0.055 $Al(OH)_3$<br>0.055 $CoCO_3$ | 1000° C., air, 8 hours | 21% O3, 79% P2 |
| Ex. 26 (X2994) [Na] = 0.833 | $Na_{0.833}Fe_{0.200}Mn_{0.483}Mg_{0.0917}Cu_{0.225}O_2$ | 0.4167 $Na_2CO_3$,<br>0.1000 $Fe_2O_3$,<br>0.4333 $MnO_2$,<br>0.0917 $Mg(OH)_2$,<br>0.2250 CuO | 700° C., air, 20 hours | 85% O3 15% P2 |
| Ex. 27 (X2987) [Na] = 1 | $NaLi_{0.05}Ni_{0.3}Mn_{0.525}Mg_{0.025}Cu_{0.1}O_2$ | 0.5 $Na_2CO_3$<br>0.025 $Li_2CO_3$,<br>0.3 $NiCO_3$,<br>0.525 $MnO_2$,<br>0.025 $Mg(OH)_2$,<br>0.1 CuO | 800° C., air, 8 hours | 54% O3 46% P2 |
| Ex. 28 (X2645) [Na] = 0.775 | $Na_{0.775}Ni_{0.35}Mn_{0.475}Ti_{0.1}Al_{0.075}O_2$ | 0.3875 $Na_2CO_3$,<br>0.35 $NiCO_3$,<br>0.475 $MnO_2$,<br>0.1 $TiO_2$,<br>0.075 $Al(OH)_3$ | 900° C., air, 8 hours | 24% O3 76% P2 |
| Ex. 29 (X2809) [Na] = 0.833 | $Na_{0.833}Ca_{0.05}Ni_{0.3417}Mn_{0.4417}Mg_{0.125}Ti_{0.0917}O_2$ | 0.4167 $Na_2CO_3$,<br>0.05 $CaCO_3$,<br>0.34167 $NiCO_3$,<br>0.44167 $MnO_2$,<br>0.125 $Mg(OH)_2$,<br>0.09167 $TiO_2$ | 900° C., air, 8 hours | 84% O3 16% P2 |

Product Analysis Using XRD

Analysis by X-ray diffraction techniques was conducted using a Siemens® D5000 powder diffractometer to confirm that the desired target compositions had been prepared, to establish the phase purity of the product material and to determine the types of impurities present. From this information it is possible to determine the lattice parameters of the unit cells and the relative phase ratios.

The general XRD operating conditions used to analyse the materials are as follows:

Slits sizes: 1 mm, 1 mm, 0.1 mm
Range: 2θ=5°-60°
X-ray Wavelength=1.5418 Å (Angstroms) (Cu Kα)
Speed: 1.0 seconds/step
Increment: 0.025°

Electrochemical Results

The target compositions were tested using a Na-ion test cell using a hard carbon anode. Cells may be made using the following procedures:

A Na-ion electrochemical test cell containing the active material is constructed as follows:

Generic Procedure to Make a Hard Carbon Na-Ion Cell

The positive electrode is prepared by solvent-casting a slurry of the active material, conductive carbon, binder and solvent. The conductive carbon used is Super C65C65 (Timcal®). PVdF is used as the binder, and N-methyl-2-pyrrolidone (NMP) is employed as the solvent. The slurry is then cast onto aluminium foil and heated until most of the solvent evaporates and an electrode film is formed. The electrode is then dried under dynamic vacuum at about 120° C. The electrode film contains the following components, expressed in percent by weight: 89% active material (doped layered oxide composition), 6% Super C65 carbon, and 5% PVdF binder.

The negative electrode is prepared by solvent-casting a slurry of the hard carbon active material (Carbotron® P/J, supplied by Kureha), conductive carbon, binder and solvent. The conductive carbon used is Super C65 (Timcal®). PVdF is used as the binder, and N-Methyl-2-pyrrolidone (NMP) is employed as the solvent. The slurry is then cast onto aluminium foil and heated until most of the solvent evaporates and an electrode film is formed. The electrode is then dried further under dynamic vacuum at about 120° C. The electrode film contains the following components, expressed in percent by weight: 88% active material, 3% Super C65 carbon, and 9% PVdF binder.

Cell Testing

The cells are tested as follows, using Constant Current Cycling techniques.

The cell is cycled at a given current density between pre-set voltage limits. A commercial battery cycler from Maccor Inc. (Tulsa, OK, USA) is used. On charge, alkali ions are extracted from the cathode active material. During discharge, alkali ions are re-inserted into the cathode active material.

A summary of the test results is given below in Table 2:

TABLE 2

| Example No. (Sample No.) | Cell# | D1 Specific Capacity on Cell Discharge [mAh/g] | D1 Average Cell Discharge Voltage [V] | Discharge Capacity Fade [%/cycle] | Discharge Energy Fade [%] | Discharge Energy Fade [%/cycle] |
|---|---|---|---|---|---|---|
| CE1 (X2895) | 803039 | 141 | 3.08 | 3.15 | 31 (9 cycles) | 3.4 |
| CE2 (X2896) | 803040 | 107 | 2.75 | 2.66 | 59 (19 cycles) | 3.0 |
| CE3 (X2748) | 802064 | 127 | 3.39 | 1.35 | 62 (38 cycles) | 1.6 |
| Example 1 (X2883) [Na] = 0.80 | 802066 | 118 | 3.28 | 0.08 | 8.5 (30 cycles) | 0.3 |
| Example 2 (X2505) [Na] = 0.867 | 608010 | 144 | 3.09 | 0.04 | 5.9 (36 cycles) | 0.2 |
| Example 3 (X2504) [Na] = 0.867 | 608016 | 137 | 3.06 | 0.13 | 9.4 (35 cycles) | 0.3 |
| Example 4 (X2506) [Na] = 0.867 | 608011 | 143 | 3.09 | 0.07 | 9 (30 cycles) | 0.3 |
| Example 5 (X2835) [Na] = 0.925 | 802050 | 152 | 3.2 | 0.64 | 27 (29 cycles) | 0.9 |
| Example 6 (X2836) [Na] = 0.925 | 802010 | 155 | 3.05 | 0.60 | 28 (30 cycles) | 0.9 |
| Example 7 (X2666) [Na] = 0.833 | 706007 | 127 | 3.11 | 0.89 | 27.7 (30 cycles) | 0.9 |
| Example 8 (X2663) [Na] = 0.833 | 706006 | 132 | 3.10 | 0.07 | 9.5 (32 cycles) | 0.3 |
| Example 9 (X2799) [Na] = 0.833 | 801017 | 132 | 3.09 | 0.08 | 17.6 (80 cycles) | 0.2 |
| Example 10 (X2662) [Na] = 0.833 | 706005 | 124 | 3.11 | 0.21 | 18 (39 cycles) | 0.5 |
| Example 11 (X2512) | 608029 | 133 | 3.15 | 0.11 | 12.5 (50 cycles) | 0.2 |
| Example 12 (X2519) | 608041 | 127 | 3.11 | 0.37 | 15.3 (30 cycles) | 0.5 |
| Example 13 (X2520) | 608042 | 137 | 3.11 | 0.07 | 6.3 (30 cycles) | 0.2 |
| Example 15 (X2888) | 803029 | 122 | 2.99 | 0.33 | 22 (40 cycles) | 0.6 |
| Example 17 X2890 | 803031 | 131 | 3.09 | 1.35 | 22 (17 cycles) | 1.0 |
| Example 18 X2891 | 803032 | 132 | 3.10 | 0.05 | 3 (14 cycles) | 0.2 |
| Example 19 X2717 | 709040 | 120 | 3.23 | 0.17 | 15 (50 cycles) | 0.3 |
| Example 20 X2718 | 709041 | 118 | 3.21 | 0.17 | 14.5 (50 cycles) | 0.3 |
| Example 21 X2892 | 803037 | 126 | 3.04 | 0.49 | 13.8 (18 cycles) | 0.8 |
| Example 22 X2712 | 709025 | 119 | 3.19 | 0.02 | 6.1 (50 cycles) | 0.1 |
| Example 23 X2670 | 708018 | 125 | 3.23 | 0.06 | 9.2 (51 cycles) | 0.2 |
| Example 24 X2900 | 803052 | 112 | 3.23 | 0.09 | 0.5 (18 cycles) | 0.0 |
| Example 25 X2901 | 803053 | 109 | 3.32 | 0.05 | 0.02 (20 cycles) | 0.0 |

TABLE 2-continued

| Example No. (Sample No.) | Cell# | D1 Specific Capacity on Cell Discharge [mAh/g] | D1 Average Cell Discharge Voltage [V] | Discharge Capacity Fade [%/cycle] | Discharge Energy Fade [%] | Discharge Energy Fade [%/cycle] |
|---|---|---|---|---|---|---|
| Example 26 (X2994) [Na] = 0.833 | 811026 | 76 | 2.65 | 0.02 | 13.6 (61 cycles) | 0.2 |
| Example 27 (X2987) [Na] = 1 | 811032 | 127 | 2.93 | 0.00 | 5.1 (39 cycles) | 0.1 |
| Example 28 (X2645) [Na] = 0.775 | 705040 | 124 | 3.29 | 0.29 | 27.4 (70 cycles) | 0.4 |
| Example 29 (X2809) [Na] = 0.833 | 801035 | 135 | 3.01 | 0.12 | 24.4 (100 cycles) | 0.2 |

Discussion of the Results

Comparative Example 1

$NaNi_{0.5}Mn_{0.5}O_2$ (Sample X2895)

FIG. 1 shows the X-ray diffraction pattern of the known material $NaNi_{0.5}Mn_{0.5}O_2$ (sample number X2895). The pattern shows that this material conforms to a single phase doped layered O3-type structure.

Figure 2:
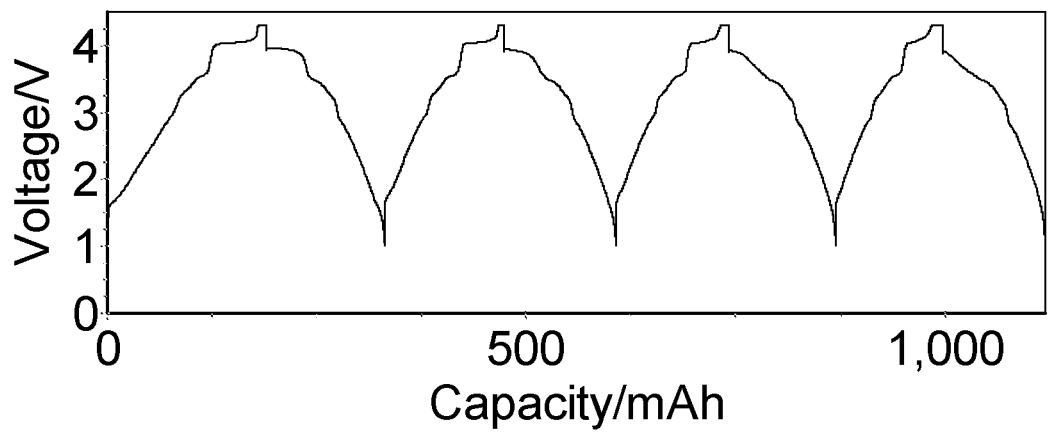
FIG. 2 shows the cell voltage profile (i.e. Na-ion cell voltage [V] versus cumulative cathode specific capacity [mAh/g]) for the first 4 charge/discharge cycles of the hard carbon//$NaNi_{0.5}Mn_{0.5}O_2$ (CE1) cell.
Figure 3:
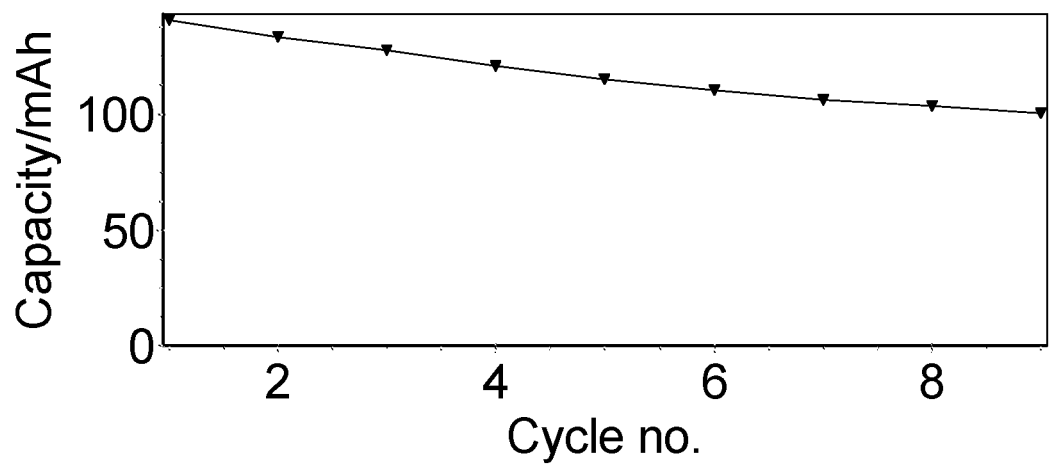
FIG. 3 FIG. 3 shows the constant current cycling (CC/CV) of a full Na-ion cell comprising hard carbon and O3-$NaNi_{0.5}Mn_{0.5}O_2$ (CE1), in the voltage range 1.0-4.3 V, at 30° C., in an electrolyte comprising 0.5 M NaPF6 dissolved in a mixture of ethylene carbonate (EC), propylene carbonate (PC) and diethyl carbonate (DEC), with glass fibre filter paper (Whatman® Grade GF/A) used as a separator.

The data shown in FIGS. 2 and 3 are derived from the constant current cycling data for an $O3-NaNi_{0.5}Mn_{0.5}O_2$ cathode active material in a Na-ion cell (cell #803039) where this cathode material was coupled with a hard carbon anode material. The electrolyte used was a solution of 0.5 M $NaPF_6$ in a mixture of ethylene carbonate (EC), propylene carbonate (PC) and diethyl carbonate (DEC). The constant current data were collected at an approximate current density of 0.25 mA/cm$^2$ between voltage limits of 1.00 and 4.3 V. To ensure that the Na-ion cell was fully charged, the cell was potentiostatically held at 4.3 V at the end of the constant current charging process until the current density dropped to 10% of the constant current value. The testing was carried out at 30° C. During the charging process, sodium ions are extracted from the cathode active material, and inserted into the hard carbon anode. During the subsequent discharge process, sodium ions are extracted from the hard carbon and reinserted into the cathode active material.

FIG. 2 shows the cell voltage profile (i.e. Na-ion cell voltage [V] versus cumulative cathode specific capacity [mAh/g]) for the first 4 charge/discharge cycles of the hard carbon//$NaNi_{0.5}Mn_{0.5}O_2$ cell. These data demonstrate a relatively poor level of capacity retention and a relatively large level of voltage hysteresis (i.e. the voltage difference between the charge and discharge processes), indicating the relatively poor kinetic reversibility of the Na-ion extraction-insertion reactions in this cathode material.

FIG. 3 shows the constant current cycle life profile, i.e. the relationship between cathode specific capacity for discharge [mAh/g]) and cycle number for the hard carbon//$NaNi_{0.5}Mn_{0.5}O_2$ cell. For cycle 1, the discharge specific capacity for the cathode is about 141 mAh/g. For cycle 9, the discharge specific capacity for the cathode is about 101 mAh/g. This represents a capacity fade of 28.37% over 9 cycles or an average of 3.15% per cycle. The cathode material under test clearly demonstrates relatively poor capacity retention behaviour.

Comparative Example 2

$NaNi_{0.5}Ti_{0.5}O_2$ (Sample) X2896

Figure 4:
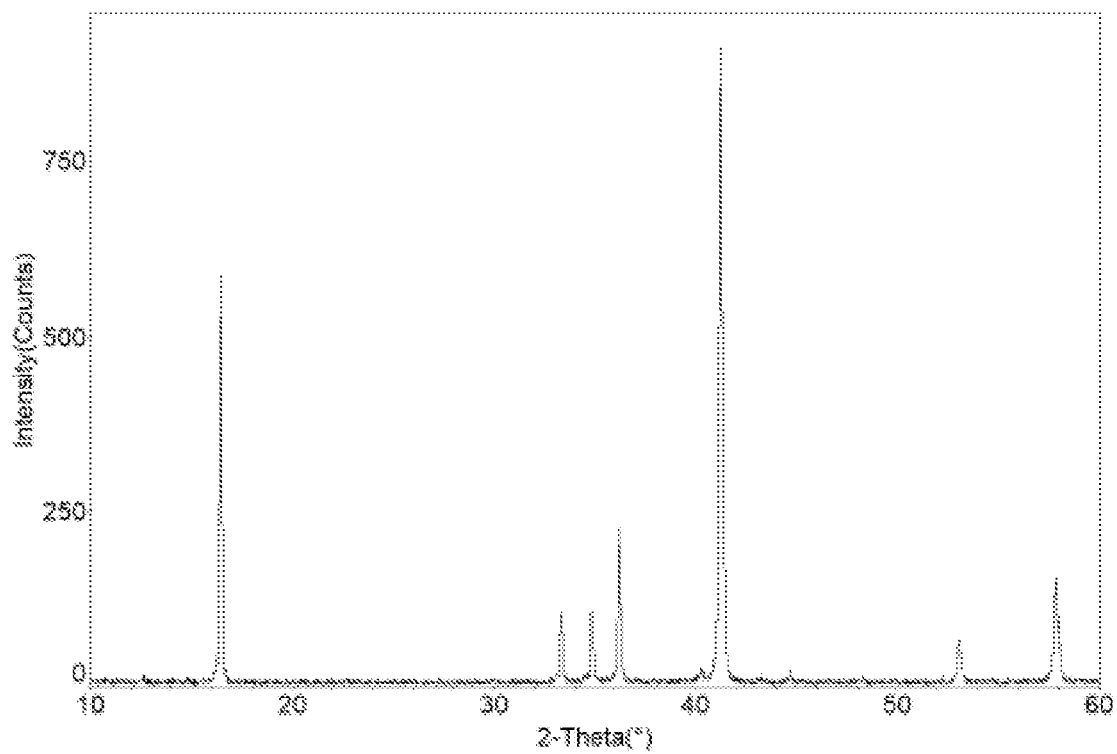
FIG. 4 is the XRD profile of the known material $NaNi_{0.5}Ti_{0.5}O_2$ (CE2)
Figure 5:
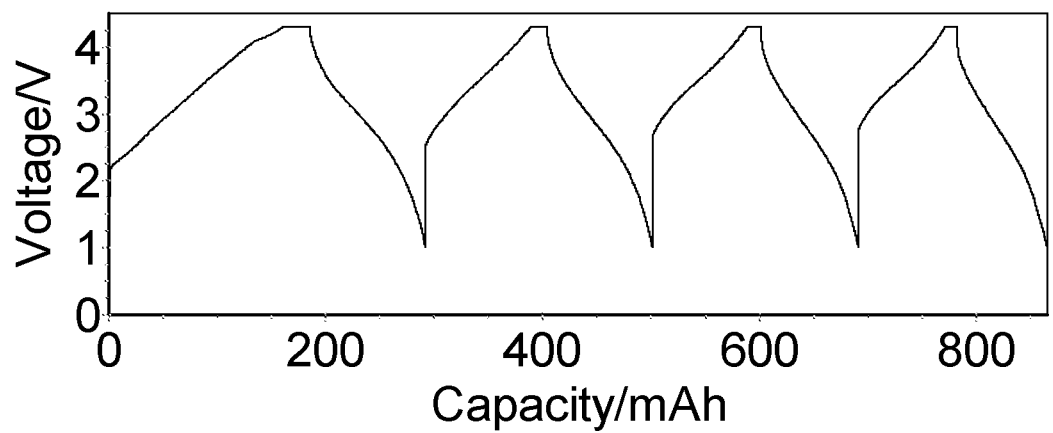
FIG. 5 shows the cell voltage profile (i.e. Na-ion cell voltage [V] versus cumulative cathode specific capacity [mAh/g]) for the first 4 charge/discharge cycles of the hard carbon//$NaNi_{0.5}Ti_{0.5}O_2$ (CE2) cell.
Figure 6:
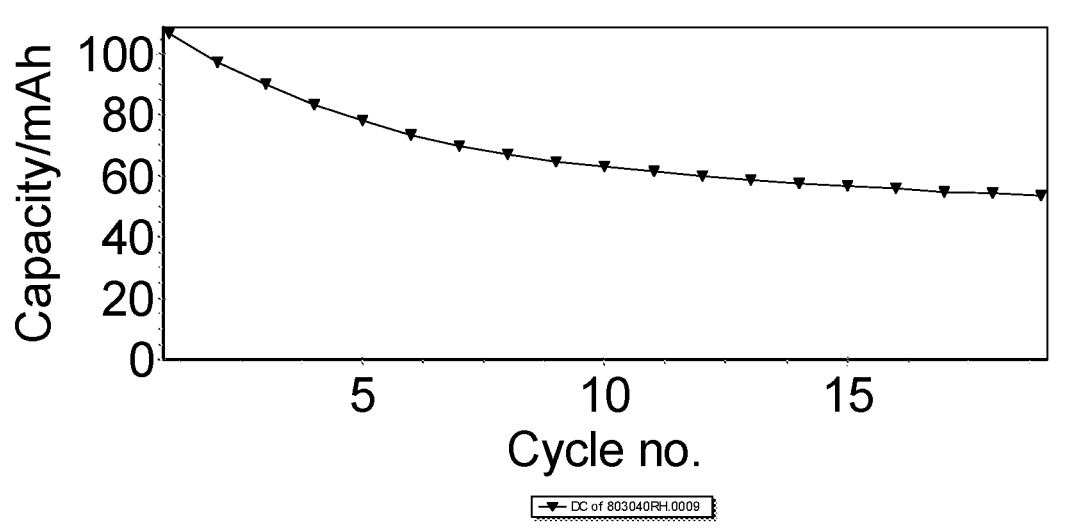
FIG. 6 shows the constant current cycling (CC/CV) of a full Na-ion cell comprising hard carbon and O3-$NaNi_{0.5}Ti_{0.5}O_2$ (CE2), in the voltage range 1.0-4.3 V, at 30° C., in an electrolyte comprising 0.5 M $NaPF_6$ dissolved in a mixture of ethylene carbonate (EC), propylene carbonate (PC) and diethyl carbonate (DEC), with glass fibre filter paper (Whatman® Grade GF/A) used as a separator.

The XRD pattern shown in FIG. 4 confirms that this material conforms to a single phase doped layered O3-type structure;

The data shown in FIGS. 5 and 6 are derived from the constant current cycling data for an $O3-NaNi_{0.5}Ti_{0.5}O_2$ cathode active material in a Na-ion cell (cell #803040RH) where this cathode material was coupled with a hard carbon anode material. The electrolyte used was a solution of 0.5 M $NaPF_6$ in a mixture of ethylene carbonate (EC), propylene carbonate (PC) and diethyl carbonate (DEC). The constant current data were collected at an approximate current density of 0.25 mA/cm$^2$ between voltage limits of 1.00 and 4.3 V. To ensure that the Na-ion cell was fully charged, the cell was potentiostatically held at 4.3 V at the end of the constant current charging process until the current density dropped to 10% of the constant current value. The testing was carried out at 30° C.

During the charging process, sodium ions are extracted from the cathode active material, and inserted into the hard carbon anode. During the subsequent discharge process, sodium ions are extracted from the hard carbon and reinserted into the cathode active material. FIG. 5 shows the cell voltage profile (i.e. Na-ion cell voltage [V] versus cumulative cathode specific capacity [mAh/g]) for the first 4 charge/discharge cycles of the hard carbon//$NaNi_{0.5}Ti_{0.5}O_2$ cell. These data demonstrate a relatively poor level of capacity retention and a relatively large level of voltage hysteresis (i.e. the voltage difference between the charge and discharge processes), indicating the relatively poor kinetic reversibility of the Na-ion extraction-insertion reactions in this cathode material.

FIG. 6 shows the constant current cycle life profile, i.e. the relationship between cathode specific capacity for discharge [mAh/g]) and cycle number for the hard carbon//$NaNi_{0.5}Ti_{0.5}O_2$ cell. For cycle 1, the discharge specific capacity for the cathode is about 107 mAh/g. For cycle 19, the discharge specific capacity for the cathode is about 53 mAh/g. This represents a capacity fade of 50.47% over 19 cycles or an average of 2.66% per cycle. The cathode material under test clearly demonstrates relatively poor capacity retention behaviour.

Comparative Example 3

$Na_{0.667}Ni_{0.333}Mn_{0.667}O_2$ (Sample X2748)

Figure 7:
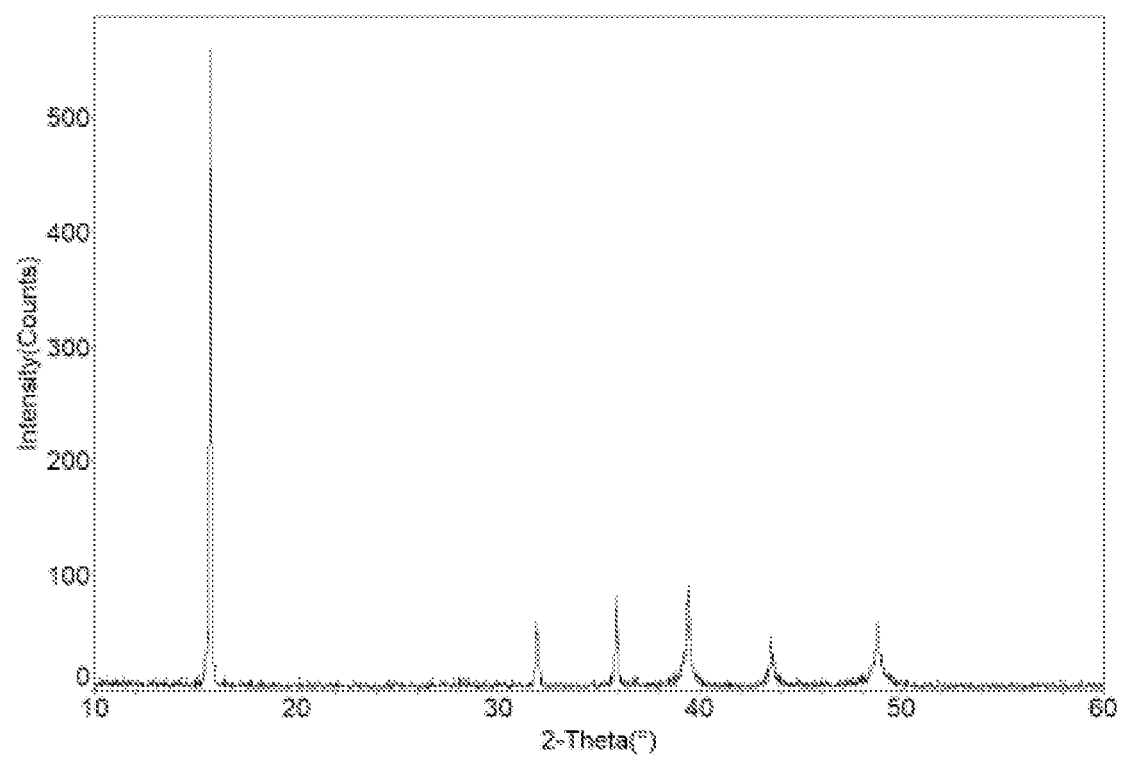
FIG. 7 is the XRD profile for the known compound P2-$Na_{0.667}Ni_{0.333}Mn_{0.667}O_2$ (CE3)

FIG. 7 shows the X-ray diffraction pattern of the known material $Na_{0.667}Ni_{0.333}Mn_{0.667}O_2$ (sample number X2748). The pattern shows that this material conforms to a layered P2-type structure.

Figure 8:
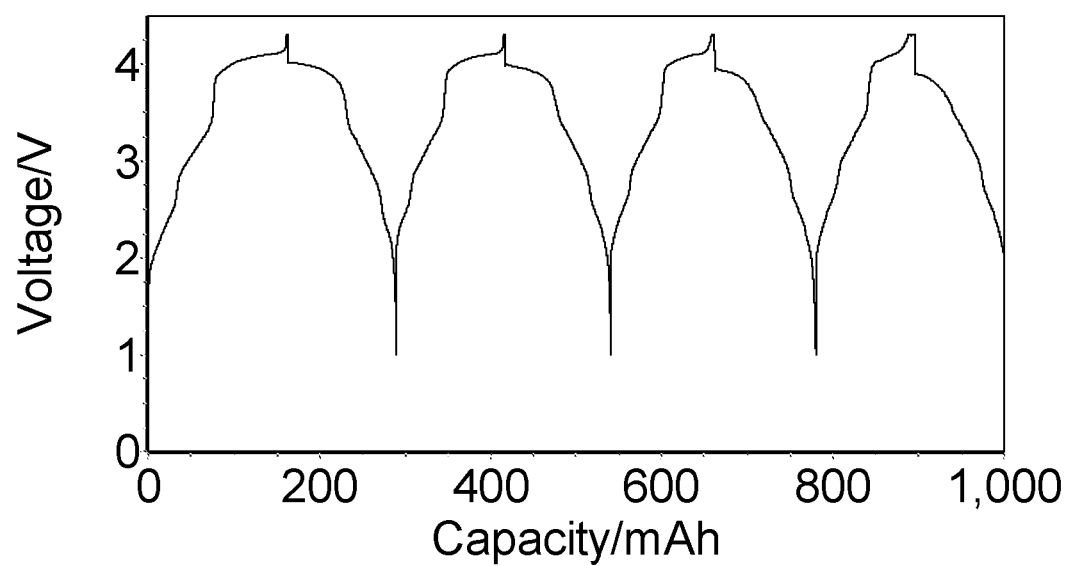
FIG. 8 shows the cell voltage profile (i.e. Na-ion cell voltage [V] versus cumulative cathode specific capacity [mAh/g]) for the first 4 charge/discharge cycles of the hard carbon//$Na_{0.667}Ni_{0.333}Mn_{0.667}O_2$ (CE3) cell.
Figure 9:
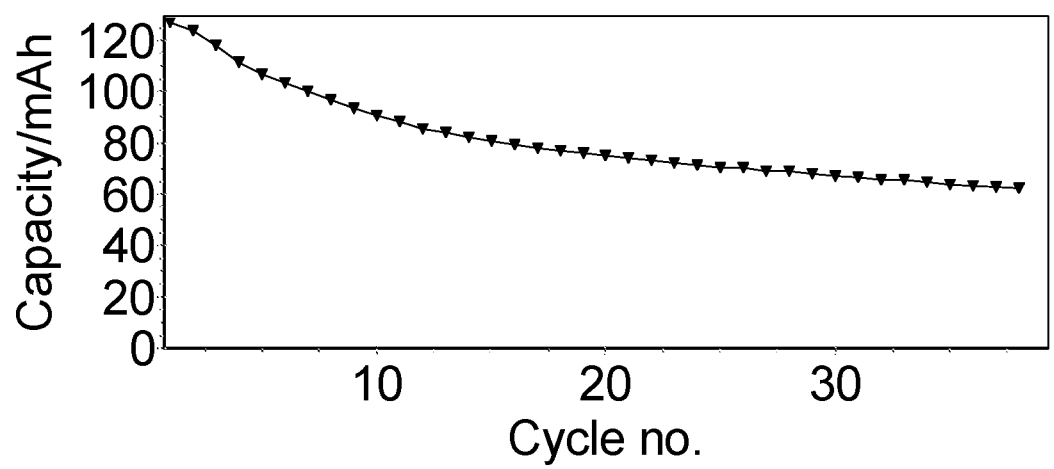
FIG. 9 shows the constant current cycling (CC/CV) of a full Na-ion cell comprising hard carbon and P2-$Na_{0.667}Ni_{0.333}Mn_{0.667}O_2$ (CE3), in the voltage range 1.0-4.3 V, at 30° C., in an electrolyte comprising 0.5 M $NaPF_6$ dissolved in a mixture of ethylene carbonate (EC), propylene carbonate (PC) and diethyl carbonate (DEC), with glass fibre filter paper (Whatman® Grade GF/A) used as a separator.

The data shown in FIGS. 8 and 9 are derived from the constant current cycling data for a P2-$Na_{0.667}Ni_{0.333}Mn_{0.667}O_2$ cathode active material in a Na-ion cell (cell #802064) where this cathode material was coupled with a hard carbon anode material. The electrolyte used was a solution of 0.5 M $NaPF_6$ in a mixture of ethylene carbonate (EC), propylene carbonate (PC) and diethyl carbonate (DEC). The constant current data were collected at an approximate current density of 0.25 mA/cm² between voltage limits of 1.00 and 4.3 V. To ensure that the Na-ion cell was fully charged, the cell was potentiostatically held at 4.3 V at the end of the constant current charging process until the current density dropped to 10% of the constant current value. The testing was carried out at 30° C.

During the charging process, sodium ions are extracted from the cathode active material, and inserted into the hard carbon anode. During the subsequent discharge process, sodium ions are extracted from the hard carbon and reinserted into the cathode active material. FIG. 8 shows the cell voltage profile (i.e. Na-ion cell voltage [V] versus cumulative cathode specific capacity [mAh/g]) for the first 4 charge/discharge cycles of the hard carbon//$Na_{0.667}Ni_{0.333}Mn_{0.667}O_2$ cell. These data demonstrate a relatively poor level of capacity retention and a relatively large level of voltage hysteresis (i.e. the voltage difference between the charge and discharge processes), indicating the relatively poor kinetic reversibility of the Na-ion extraction-insertion reactions in this cathode material.

FIG. 9 shows the constant current cycle life profile, i.e. the relationship between cathode specific capacity for discharge [mAh/g]) and cycle number for the hard carbon $Na_{0.667}Ni_{0.333}Mn_{0.667}O_2$ cell. For cycle 1, the discharge specific capacity for the cathode is about 127 mAh/g. For cycle 38, the discharge specific capacity for the cathode is about 62 mAh/g. This represents a capacity fade of 51.18% over 38 cycles or an average of 1.35% per cycle. The cathode material under test clearly demonstrates relatively poor capacity retention behaviour.

Results for a Selection of Representative Examples According to the Present Invention

Example 2

$Na_{0.867}Ni_{0.333}Mn_{0.467}Mg_{0.1}Ti_{0.1}O_2$ (Sample X2505)

Figure 10:
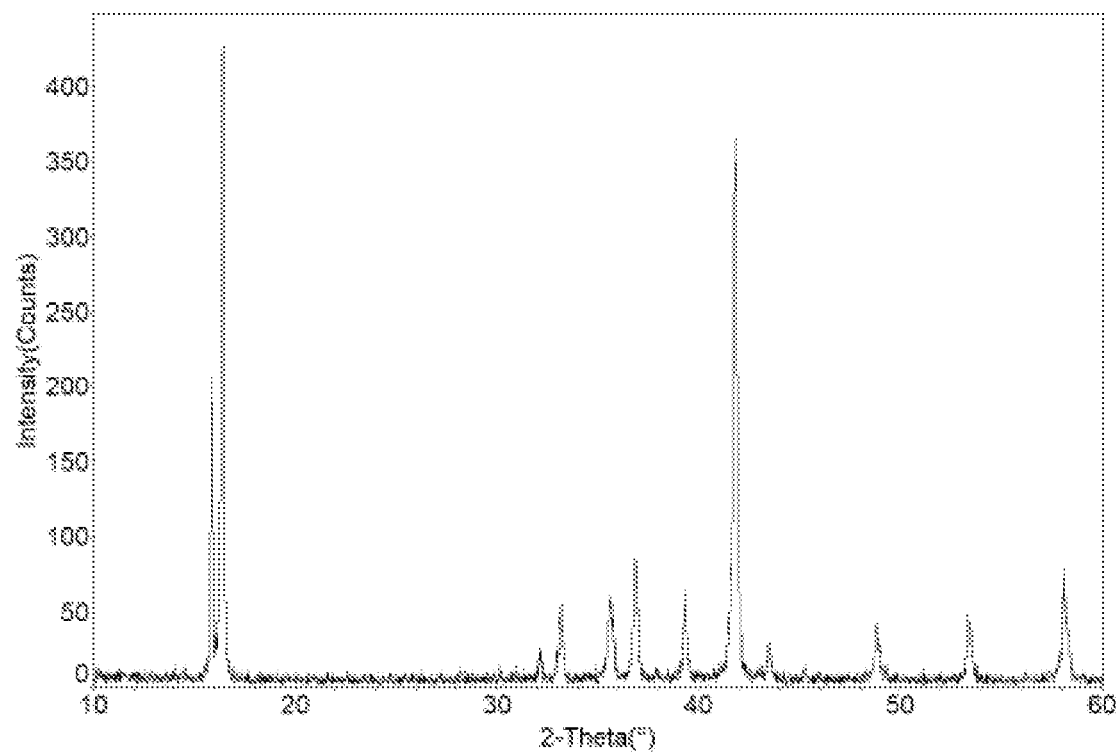
FIG. 10 is the XRD profile for O3/P2-$Na_{0.667}Ni_{0.333}Mn_{0.467}Mg_{0.1}Ti_{0.1}O_2$ prepared in Example 2.

FIG. 10 shows the X-ray diffraction pattern of the material $Na_{0.867}Ni_{0.333}Mn_{0.467}Mg_{0.1}Ti_{0.1}O_2$ (sample number X2505). The pattern shows that this material comprises a mixture of phases with a first phase with an O3-type structure and a second phase with a P2-type structure. The percentage amounts of the first and second phases were determined using Rietveld refinement.

Figure 11:
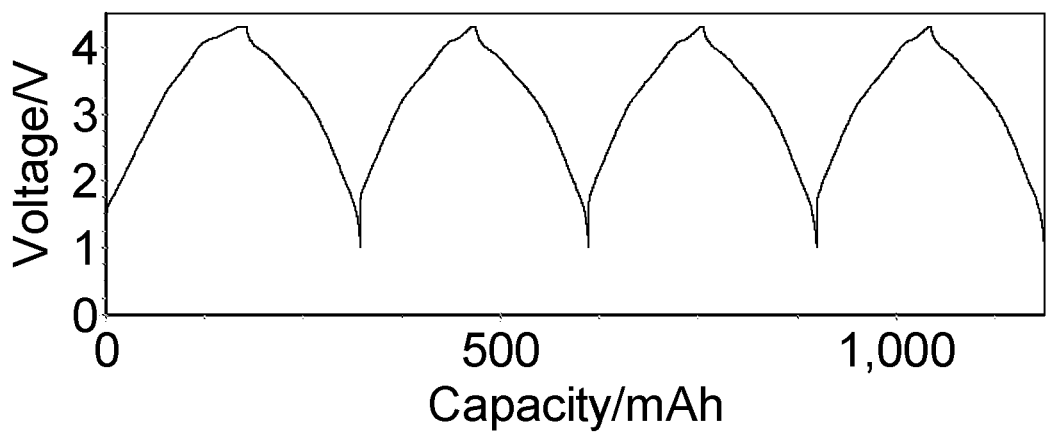
FIG. 11 shows the cell voltage profile (i.e. Na-ion cell voltage [V] versus cumulative cathode specific capacity [mAh/g]) for the first 4 charge/discharge cycles of the hard carbon//$Na_{0.867}Ni_{0.333}Mn_{0.467}Mg_{0.1}Ti_{0.1}O$ (Example 2) cell.
Figure 12:
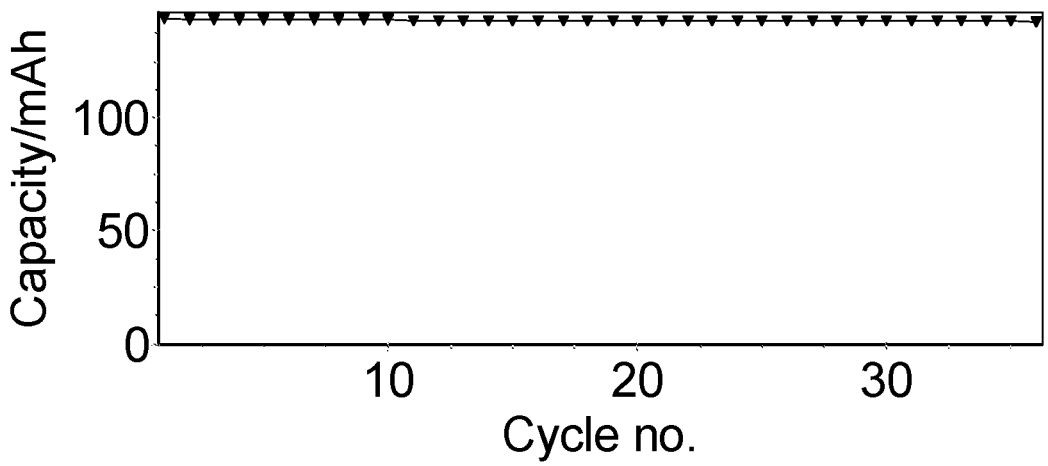
FIG. 12 shows the constant current cycling (CC/CV) of a full Na-ion cell comprising hard carbon and O3/P2-$Na_{0.867}Ni_{0.333}Mn_{0.467}Mg_{0.1}Ti_{0.1}O_2$ (Example 2), in the voltage range 1.0-4.3 V, at 30° C., in an electrolyte comprising 0.5 M $NaPF_6$ dissolved in a mixture of ethylene carbonate (EC), propylene carbonate (PC) and diethyl carbonate (DEC), with glass fibre filter paper (Whatman® Grade GF/A) used as a separator.

The data shown in FIGS. 11 and 12 are derived from the constant current cycling data for an O3/P2-$Na_{0.867}Ni_{0.333}Mn_{0.467}Mg_{0.1}Ti_{0.1}O_2$ cathode active material in a Na-ion cell (cell #608010 where this cathode material was coupled with a hard carbon anode material. The electrolyte used was a solution of 0.5 M $NaPF_6$ in a mixture of ethylene carbonate (EC), propylene carbonate (PC) and diethyl carbonate (DEC). The constant current data were collected at an approximate current density of 0.25 mA/cm² between voltage limits of 1.00 and 4.3 V. To ensure that the Na-ion cell was fully charged, the cell was potentiostatically held at 4.3 V at the end of the constant current charging process until the current density dropped to 10% of the constant current value. The testing was carried out at 30° C.

During the charging process, sodium ions are extracted from the cathode active material, and inserted into the hard carbon anode. During the subsequent discharge process, sodium ions are extracted from the hard carbon and reinserted into the cathode active material. FIG. 11 shows the cell voltage profile (i.e. Na-ion cell voltage [V] versus cumulative cathode specific capacity [mAh/g]) for the first 4 charge/discharge cycles of the hard carbon//$Na_{0.867}Ni_{0.333}Mn_{0.467}Mg_{0.1}Ti_{0.1}O_2$ cell. These data demonstrate an excellent level of capacity retention and a small level of voltage hysteresis (i.e. the voltage difference between the charge and discharge processes), indicating the excellent kinetic reversibility of the Na-ion extraction-insertion reactions. In addition, the generally symmetrical nature of the charge/discharge voltage profile confirms the excellent reversibility of the extraction-insertion reactions.

FIG. 12 shows the constant current cycle life profile, i.e. the relationship between cathode specific capacity for discharge [mAh/g]) and cycle number for the hard carbon//$Na_{0.867}Ni_{0.333}Mn_{0.467}Mg_{0.1}Ti_{0.1}O_2$ cell. For cycle 1, the discharge specific capacity for the cathode is about 144 mAh/g. For cycle 36, the discharge specific capacity for the cathode is about 142 mAh/g. This represents a capacity fade of 1.39% over 36 cycles or an average of 0.04% per cycle. The cathode material under test clearly demonstrates excellent capacity retention behaviour.

Example 4

$Na_{0.867}Ni_{0.333}Mn_{0.467}Mg_{0.1}Ti_{0.1}O_2$ (Sample X2506)

Figure 13:
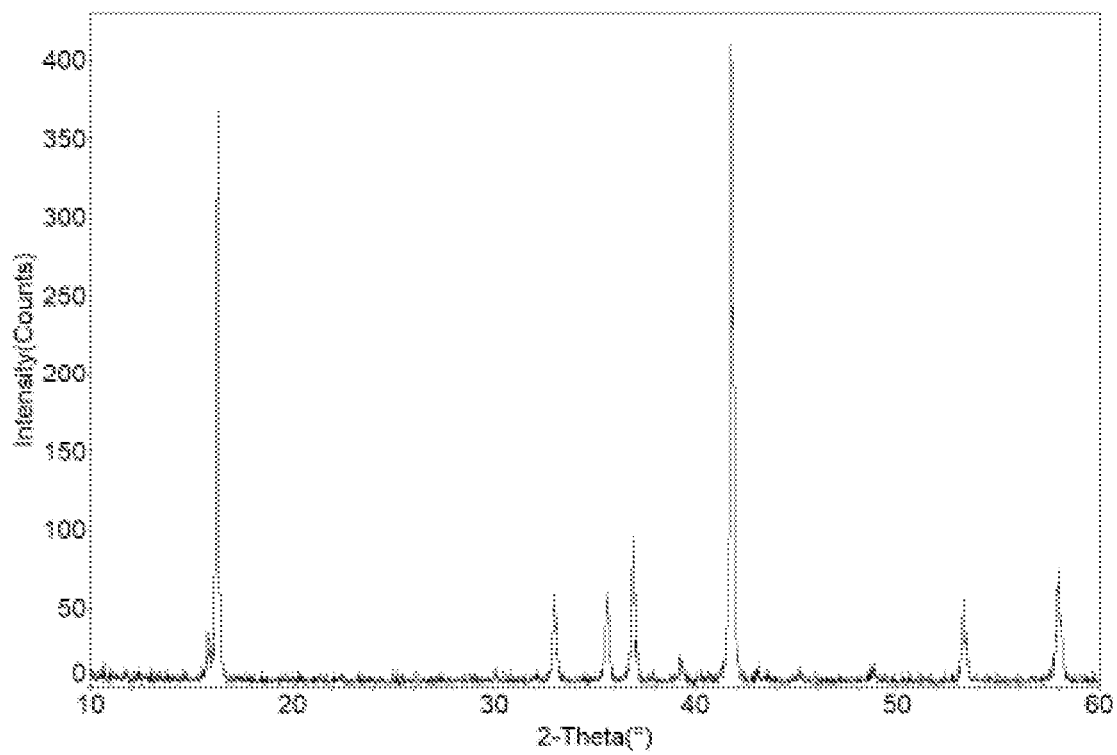
FIG. 13 is the XRD profile for O3/P2-$Na_{0.867}Ni_{0.333}Mn_{0.467}Mg_{0.1}Ti_{0.1}O_2$ prepared in Example 4.

FIG. 13 shows the X-ray diffraction pattern of the material $Na_{0.867}Ni_{0.333}Mn_{0.467}Mg_{0.1}Ti_{0.1}O_2$ (sample number X2506). The pattern shows that this material comprises a mixture of phases with a first phase with an O3-type structure and a second phase with a P2-type structure. The percentage amounts of the first and second phases were determined using Rietveld refinement.

Figure 14:
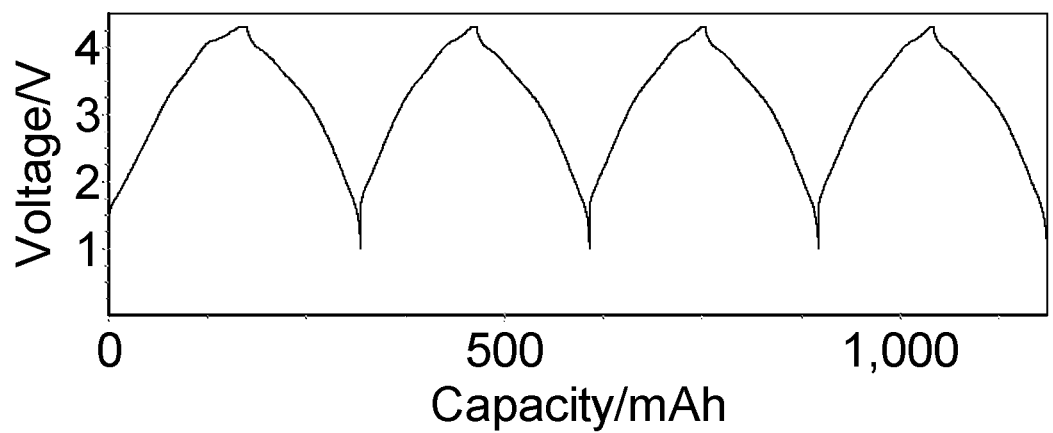
FIG. 14 shows the cell voltage profile (i.e. Na-ion cell voltage [V] versus cumulative cathode specific capacity [mAh/g]) for the first 4 charge/discharge cycles of the hard carbon//$Na_{0.867}Ni_{0.333}Mn_{0.467}Mg_{0.1}Ti_{0.1}O_2$ (Example 4) cell.
Figure 15:
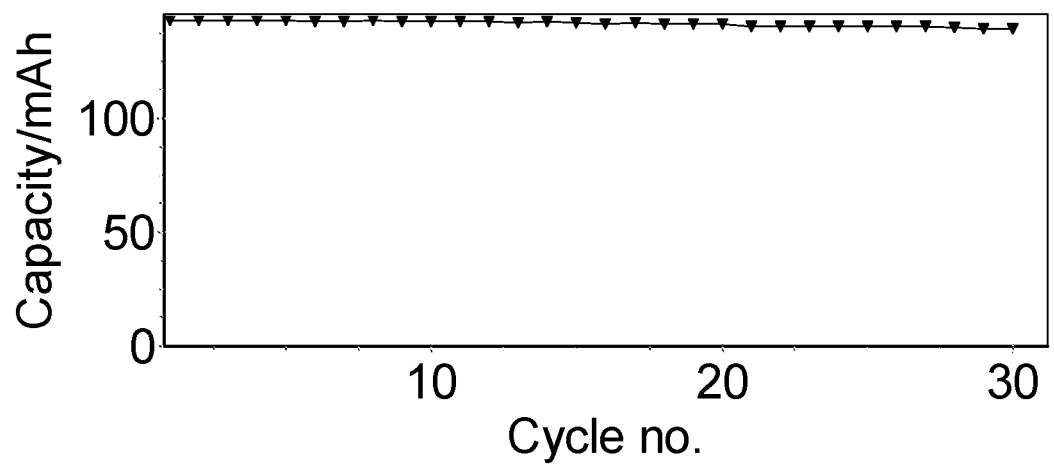
FIG. 15 shows the constant current cycling (CC/CV) of a full Na-ion cell comprising hard carbon and O3/P2-$Na_{0.867}Ni_{0.333}Mn_{0.467}Mg_{0.1}Ti_{0.1}O_2$ (Example 4), in the voltage range 1.0-4.3 V, at 30° C., in an electrolyte comprising 0.5 M $NaPF_6$ dissolved in a mixture of ethylene carbonate (EC), propylene carbonate (PC) and diethyl carbonate (DEC), with glass fibre filter paper (Whatman® Grade GF/A) used as a separator.

The data shown in FIGS. 14 and 15 are derived from the constant current cycling data for an O3/P2-$Na_{0.867}Ni_{0.333}Mn_{0.467}Mg_{0.1}Ti_{0.1}O_2$ cathode active material in a Na-ion cell (cell #608011) where this cathode material was coupled with a hard carbon anode material. The electrolyte used was a solution of 0.5 M $NaPF_6$ in a mixture of ethylene carbonate (EC), propylene carbonate (PC) and diethyl carbonate (DEC). The constant current data were collected at an approximate current density of 0.25 mA/cm² between voltage limits of 1.00 and 4.3 V. To ensure that the Na-ion cell was fully charged, the cell was potentiostatically held at 4.3 V at the end of the constant current charging process until the current density dropped to 10% of the constant current value. The testing was carried out at 30° C.

During the charging process, sodium ions are extracted from the cathode active material, and inserted into the hard carbon anode. During the subsequent discharge process, sodium ions are extracted from the hard carbon and reinserted into the cathode active material. FIG. 14 shows the cell voltage profile (i.e. Na-ion cell voltage [V] versus cumulative cathode specific capacity [mAh/g]) for the first 4 charge/discharge cycles of the hard carbon//$Na_{0.867}Ni_{0.333}Mn_{0.467}Mg_{0.1}Ti_{0.1}O_2$ cell. These data demonstrate an excellent level of capacity retention and a small level of voltage hysteresis (i.e. the voltage difference between the charge and discharge processes), indicating the excellent kinetic reversibility of the Na-ion extraction-insertion reactions. In addition, the generally symmetrical nature of the charge/discharge voltage profile confirms the excellent reversibility of the extraction-insertion reactions.

FIG. 15 shows the constant current cycle life profile, i.e. the relationship between cathode specific capacity for discharge [mAh/g]) and cycle number for the hard carbon// $Na_{0.867}Ni_{0.333}Mn_{0.467}Mg_{0.1}Ti_{0.1}O_2$ cell. For cycle 1, the discharge specific capacity for the cathode is about 143 mAh/g. For cycle 30, the discharge specific capacity for the cathode is about 140 mAh/g. This represents a capacity fade of 2.10% over 30 cycles or an average of 0.07% per cycle. The cathode material under test clearly demonstrates excellent capacity retention behaviour.

Example 8

$Na_{0.833}Ni_{0.317}Mn_{0.467}Mg_{0.1}Ti_{0.117}O_2$ (Sample X2663)

Figure 16:
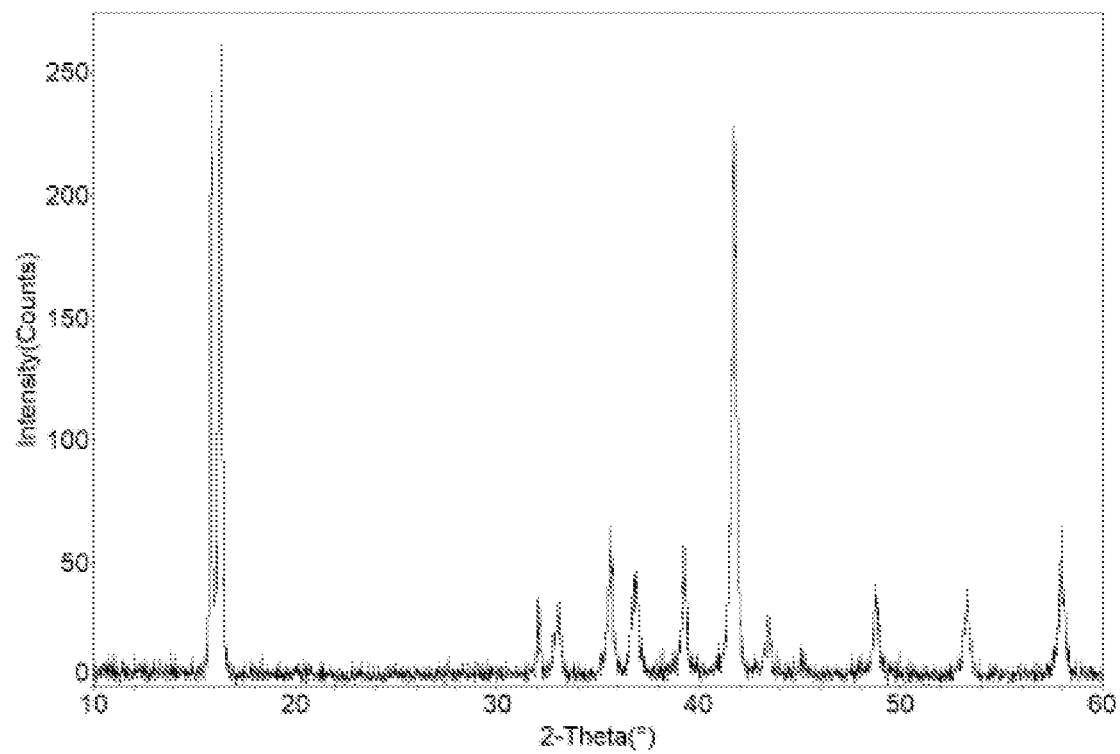
FIG. 16 is the XRD profile for O3/P2-$Na_{0.833}Ni_{0.317}Mn_{0.467}Mg_{0.1}Ti_{0.117}O_2$ prepared in Example 8.

FIG. 16 shows the X-ray diffraction pattern of the material $Na_{0.833}Ni_{0.317}Mn_{0.467}Mg_{0.1}Ti_{0.117}O_2$ (sample number X2663). The pattern shows that this material comprises a mixture of phases with a first phase with an O3-type structure and a second phase with a P2-type structure. The percentage amounts of the first and second phases were determined from these structural data.

Figure 17:
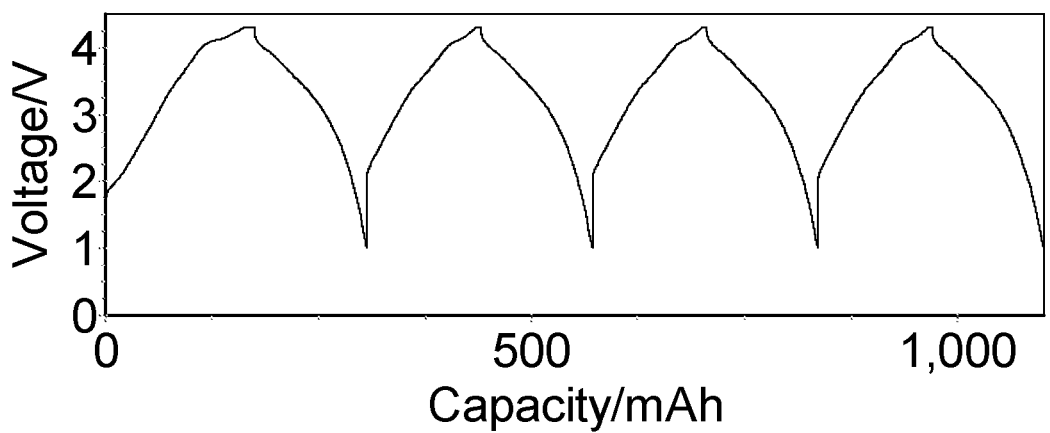
FIG. 17 shows the cell voltage profile (i.e. Na-ion cell voltage [V] versus cumulative cathode specific capacity [mAh/g]) for the first 4 charge/discharge cycles of the hard carbon//$Na_{0.833}Ni_{0.317}Mn_{0.467}Mg_{0.1}Ti_{0.117}O_2$ (Example 8) cell.
Figure 18:
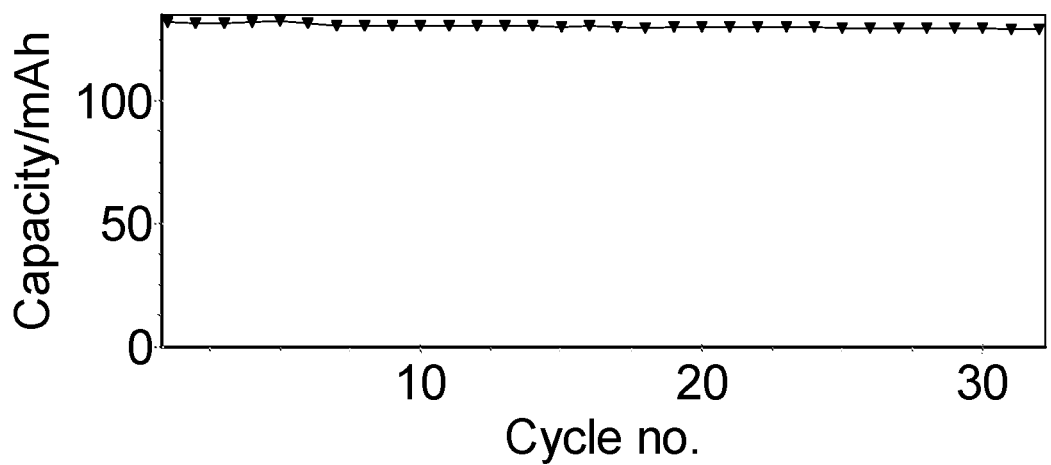
FIG. 18 shows the constant current cycling (CC/CV) of a full Na-ion cell comprising hard carbon and O3/P2-$Na_{0.833}Ni_{0.317}Mn_{0.467}Mg_{0.1}Ti_{0.117}O_2$ (Example 8), in the voltage range 1.0-4.3 V, at 30° C., in an electrolyte comprising 0.5 M $NaPF_6$ dissolved in a mixture of ethylene carbonate (EC), propylene carbonate (PC) and diethyl carbonate (DEC), with glass fibre filter paper (Whatman® Grade GF/A) used as a separator.

The data shown in FIGS. 17 and 18 are derived from the constant current cycling data for an O3/P2-$Na_{0.833}Ni_{0.317}Mn_{0.467}Mg_{0.1}Ti_{0.117}O_2$ cathode active material in a Na-ion cell (cell #706006) where this cathode material was coupled with a hard carbon anode material. The electrolyte used was a solution of 0.5 M $NaPF_6$ in a mixture of ethylene carbonate (EC), propylene carbonate (PC) and diethyl carbonate (DEC). The constant current data were collected at an approximate current density of 0.25 mA/cm² between voltage limits of 1.00 and 4.3 V. To ensure that the Na-ion cell was fully charged, the cell was potentiostatically held at 4.3 V at the end of the constant current charging process until the current density dropped to 10% of the constant current value. The testing was carried out at 30° C.

During the charging process, sodium ions are extracted from the cathode active material, and inserted into the hard carbon anode. During the subsequent discharge process, sodium ions are extracted from the hard carbon and reinserted into the cathode active material. FIG. 17 shows the cell voltage profile (i.e. Na-ion cell voltage [V] versus cumulative cathode specific capacity [mAh/g]) for the first 4 charge/discharge cycles of the hard carbon// $Na_{0.833}Ni_{0.317}Mn_{0.467}Mg_{0.1}Ti_{0.117}O_2$ cell. These data demonstrate an excellent level of capacity retention and a small level of voltage hysteresis (i.e. the voltage difference between the charge and discharge processes), indicating the excellent kinetic reversibility of the Na-ion extraction-insertion reactions. In addition, the generally symmetrical nature of the charge/discharge voltage profile confirms the excellent reversibility of the extraction-insertion reactions.

FIG. 18 shows the constant current cycle life profile, i.e. the relationship between cathode specific capacity for discharge [mAh/g]) and cycle number for the hard carbon// $Na_{0.833}Ni_{0.317}Mn_{0.467}Mg_{0.1}Ti_{0.117}O_2$ cell. For cycle 1, the discharge specific capacity for the cathode is about 132 mAh/g. For cycle 32, the discharge specific capacity for the cathode is about 129 mAh/g. This represents a capacity fade of 2.27% over 32 cycles or an average of 0.07% per cycle. The cathode material under test clearly demonstrates excellent capacity retention behaviour.

The Relationship Between Reaction Temperature and the Amount of an O3-Type Phase Produced, Relative to the Amount of a P2-Type Phase Produced.

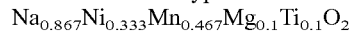

TABLE 3

| Target Stoichiometry | Sample | Synthesis Temperature (° C.) | O3 Content (Mole %) |
|---|---|---|---|
| $Na_{0.867}Ni_{0.333}Mn_{0.467}Mg_{0.1}Ti_{0.1}O_2$ | X2504 | 800 | 51 |
| | X2505 | 850 | 78 |
| | X2506 | 900 | 90 |

Figure 19:
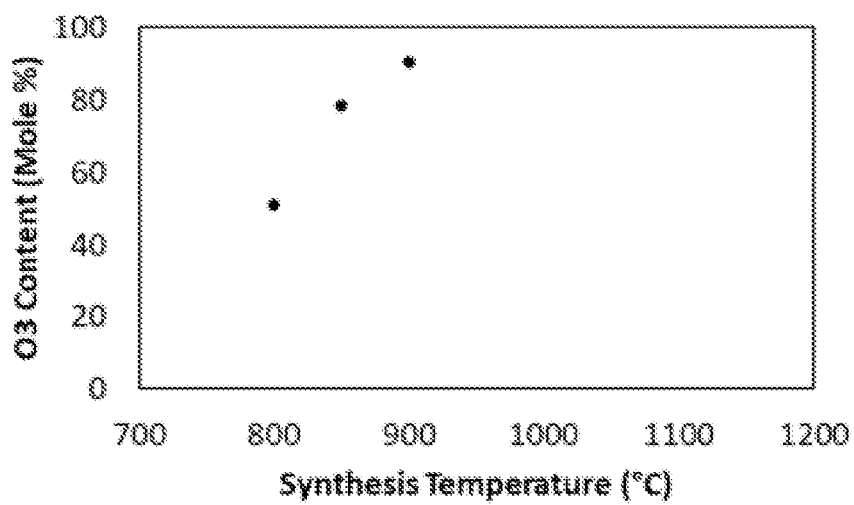
FIG. 19 is a graph to show the relationship between reaction temperature and the amount of an O3-type phase relative to the amount of a P2-type phase when preparing $Na_{0.867}Ni_{0.333}Mn_{0.467}Mg_{0.1}Ti_{0.1}O_2$.

Table 3 above and FIG. 19 show that as the synthesis temperature increases, the proportion of the phase that has an O3 structure increases relative to that of a phase with a P2 structure.

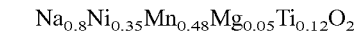

TABLE 4

| Target Stoichiometry | Sample | Synthesis Temperature (° C.) | O3 Content (Mole %) |
|---|---|---|---|
| $Na_{0.8}Ni_{0.35}Mn_{0.48}Mg_{0.05}Ti_{0.12}O_2$ | X2875 | 900 | 42 |
| | X2878 | 1000 | 67 |
| | X2883 | 1100 | 96 |

Figure 20:
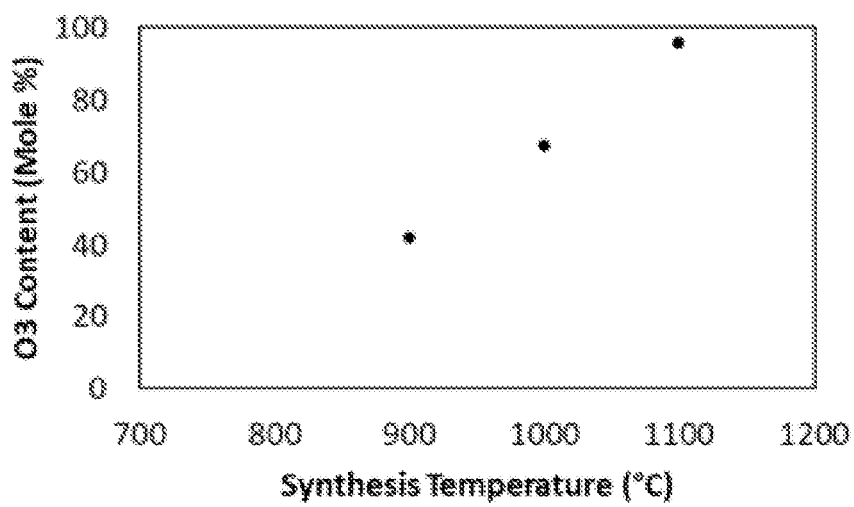
FIG. 20 is a graph to show the relationship between reaction temperature and the amount of an O3-type phase relative to the amount of a P2-type phase when preparing $Na_{0.8}Ni_{0.35}Mn_{0.48}Mg_{0.05}Ti_{0.12}O_2$.

Table 4 above and FIG. 20 show that as the synthesis temperature increases, the proportion of the phase that has an O3 structure increases relative to that of a phase with a P2 structure.

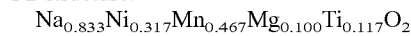

TABLE 5

| Target Stoichiometry | Sample | Synthesis Temperature (° C.) | O3 Content (Mole %) |
|---|---|---|---|
| $Na_{0.833}Ni_{0.317}Mn_{0.467}Mg_{0.100}Ti_{0.117}O_2$ | X2869 | 850 | 59 |
| | X2799 | 900 | 72 |

Figure 21:
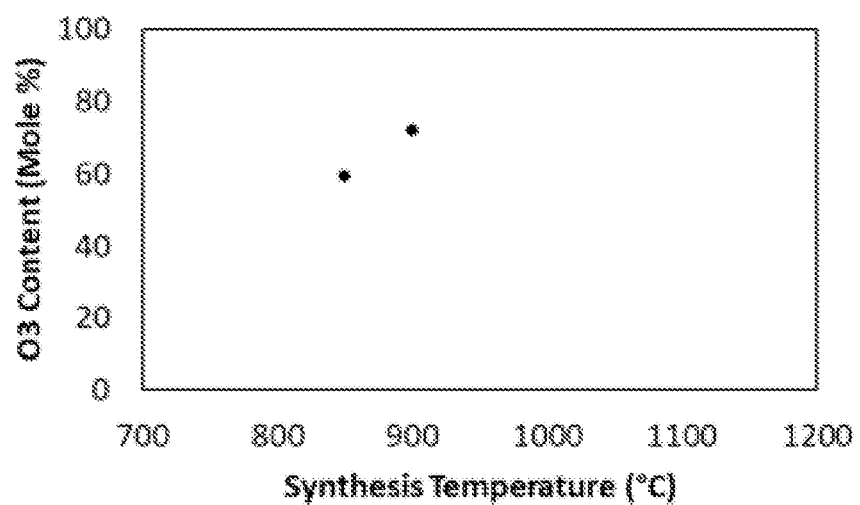
FIG. 21 is a graph to show the relationship between reaction temperature and the amount of an O3-type phase relative to the amount of a P2-type phase when preparing $Na_{0.833}Ni_{0.317}Mn_{0.467}Mg_{0.100}Ti_{0.117}O_2$.

Table 5 above and FIG. 21 show that as the synthesis temperature increases, the proportion of the phase that has an O3 structure increases relative to that of a phase with a P2 structure.

The invention claimed is:

1. An O3/P2 mixed-phase sodium-containing doped layered oxide material which comprises a mixture of phases, wherein a first phase has one or more O3-type structures and a second phase has one or more P2-type structures; further wherein the O3/P2 mixed-phase sodium-containing doped layered oxide material has a general formula:

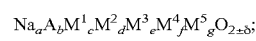

$Na_aA_bM^1_cM^2_dM^3_eM^4_fM^5_gO_{2\pm\delta}$;

wherein:
A is an alkali metal selected from at least one of lithium and potassium;
$M^1$ is one or more metals with an average oxidation state of 2+ selected from nickel, iron, manganese, cobalt, copper, magnesium, calcium and zinc;
$M^2$ is one or more metals with an average oxidation state of 4+ selected from manganese, titanium and zirconium;

M³ is one or more metals with an average oxidation state of 2+ selected from magnesium, calcium, copper, zinc and cobalt;
M⁴ is one or more metals with an average oxidation state of 4+ selected from manganese, titanium and zirconium; and
M⁵ is one or more metals with an average oxidation state of 3+ selected from aluminum, iron, cobalt, molybdenum, chromium, vanadium, scandium and yttrium;
wherein:
a>0;
0≤b<0.5;
a>b;
0.75<(a+b)≤1.0;
0≤c<0.5;
d≥0:
f≥0;
at least one of d and f is >0;
e>0;
0≤g<0.5;
0≤δ≤0.1;
wherein: a, b, c, d, e, f and g are chosen to maintain electroneutrality;
wherein the O3/P2 mixed-phase sodium-containing doped layered oxide material comprises greater than 60 to 99% of the first phase, and less than 40 to 1% of the second phase, based on the combined total number of moles of the first and second phases present in the O3/P2 mixed-phase sodium-containing doped layered oxide material;
and wherein the O3/P2 mixed-phase sodium-containing doped layered oxide material is neither a material with the general formula $Na_{0.833}Ni_{0.317}Mn_{0.467}Mg_{0.100}Ti_{0.117}O_2$ which comprises a mixture of phases in which a first phase has an O3-type structure and a second phase has a P2-type structure, wherein the amount of the first phase is 63% and the amount of the second phase is 37%, based on the combined total number of moles of the first and second phases present in the O3/P2 mixed-phase sodium-containing doped layered oxide material; nor a material with the general formula $Na_{0.95}Ni_{0.3167}Mn_{0.3167}Mg_{0.1583}Ti_{0.2083}O_2$ which comprises a mixture of phases in which a first phase has an O3-type structure and a second phase has a P2-type structure, wherein the amount of the first phase is 97% and the amount of the second phase is 3%, based on the combined total number of moles of the first and second phases in the O3/P2 mixed-phase sodium-containing doped layered oxide material.

2. The O3/P2 mixed-phase sodium-containing doped layered oxide material according to claim 1, selected from:
$NaNi_{0.400}Mn_{0.490}Mg_{0.100}Ti_{0.010}O_2$ (comprising greater than 60% to 99% of a first phase with an O3-type structure and less than 40% to 1% of a second phase with a P2-type structure);
$Na_{0.95}Ni_{0.3167}Mn_{0.3167}Mg_{0.1583}Ti_{0.2083}O_2$ (comprising greater than 60% to 99%, but not 97%, of a first phase with an O3-type structure and less than 40% to 1%, but not 3%, of a second phase with a P2-type structure);
$Na_{0.925}Ni_{0.4525}Mn_{0.5275}Mg_{0.01}Ti_{0.01}O_2$ (comprising greater than 60% to 99% of a first phase with an O3-type structure and less than 40% to 1% of a second phase with a P2-type structure);
$Na_{0.867}Ni_{0.383}Mn_{0.467}Mg_{0.05}Ti_{0.1}O_2$ (comprising greater than 60% to 99% of a first phase with an O3-type structure and less than 40% to 1% of a second phase with a P2-type structure);
$Na_{0.833}Ni_{0.317}Mn_{0.467}Mg_{0.1}Ti_{0.117}O_2$ (comprising greater than 60% to 99%, but not 63%, of a first phase with an O3-type structure and less than 40% to 1%, but not 37%, of a second phase with a P2-type structure);
$Na_{0.8}Ni_{0.35}Mn_{0.48}Mg_{0.05}Ti_{0.12}O_2$ (comprising greater than 60% to 99% of a first phase with an O3-type structure and less than 40% to 1% of a second phase with a P2-type structure);
$Na_{0.77}Ni_{0.28}Mn_{0.31}Mg_{0.05}Ti_{0.25}Fe_{0.11}O_2$ (comprising greater than 60% to 99% of a first phase with an O3-type structure and less than 40% to 1% of a second phase with a P2-type structure);
$Na_{0.77}Ni_{0.225}Mn_{0.115}Mg_{0.01}Ti_{0.35}Fe_{0.3}O_2$ (comprising greater than 60% to 99% of a first phase with an O3-type structure and less than 40% to 1% of a second phase with a P2-type structure);
$Na_{0.867}Ni_{0.333}Mn_{0.467}Mg_{0.1}Ti_{0.1}O_2$ (comprising greater than 60% to 99% of a first phase with an O3-type structure and less than 40% to 1% of a second phase with a P2-type structure);
$Na_{0.833}Ni_{0.317}Mn_{0.417}Mg_{0.05}Ti_{0.117}Co_{0.1}O_2$ (comprising greater than 60% to 99% of a first phase with an O3-type structure and less than 40% to 1% of a second phase with a P2-type structure);
$Na_{0.867}Ni_{0.383}Mn_{0.467}Mg_{0.05}Ti_{0.1}O_2$ (comprising greater than 60% to 99% of a first phase with an O3-type structure and less than 40% to 1% of a second phase with a P2-type structure);
$Na_{0.85}Ni_{0.325}Mn_{0.525}Mg_{0.100}Ti_{0.05}O_2$ (comprising greater than 60% to 99% of a first phase with an O3-type structure and less than 40% to 1% of a second phase with a P2-type structure);
$Na_{0.85}Ni_{0.325}Mn_{0.499}Mg_{0.100}Ti_{0.076}O_2$ (comprising greater than 60% to 99% of a first phase with an O3-type structure and less than 40% to 1% of a second phase with a P2-type structure);
$Na_{0.77}Ni_{0.305}Mn_{0.51}Mg_{0.025}Ti_{0.05}Al_{0.055}Co_{0.055}O_2$ (comprising greater than 60% to 99% of a first phase with an O3-type structure and less than 40% to 1% of a second phase with a P2-type structure;
$Na_{0.77}Ni_{0.305}Mn_{0.535}Mg_{0.025}Ti_{0.025}Al_{0.055}Co_{0.055}O_2$ (comprising greater than 60% to 99% of a first phase with an O3-type structure and less than 40% to 1% of a second phase with a P2-type structure;
$NaNi_{0.4}Mn_{0.49}Mg_{0.1}Ti_{0.01}O_2$ (comprising greater than 60% to 99% of a first phase with an O3-type structure and less than 40% to 1% of a second phase with a P2-type structure);
$Na_{0.77}Ni_{0.28}Mn_{0.51}Mg_{0.05}Ti_{0.05}Al_{0.055}Co_{0.055}O_2$ (comprising greater than 60% to 99% of a first phase with an O3-type structure and less than 40% to 1% of a second phase with a P2-type structure);
$Na_{0.833}Fe_{0.200}Mn_{0.483}Mg_{0.0917}Cu_{0.225}O_2$ (comprising greater than 60% to 99% of a first phase with an O3-type structure and less than 40% to 1% of a second phase with a P2-type structure);
$Na_{0.775}Ni_{0.35}Mn_{0.475}Ti_{0.1}Al_{0.075}O_2$ (comprising greater than 60% to 99% of a first phase with an O3-type structure and less than 40% to 1% of a second phase with a P2-type structure); and
$Na_{0.833}Ca_{0.05}Ni_{0.3417}Mn_{0.4417}Mg_{0.125}Ti_{0.0917}O_2$ (comprising greater than 60% to 99% of a first phase with an O3-type structure and less than 40% to 1% of a second phase with a P2-type structure);
wherein the percentage values for each of the first and second phases are based on the combined total number of moles of the first and second phases present in the O3/P2 mixed-phase sodium-containing doped layered oxide material.

3. An energy storage device comprising one or more O3/P2 mixed-phase sodium-containing doped layered oxide materials according to claim 1.

4. The energy storage device according to claim 3 selected from a battery, a rechargeable battery, an electrochemical device and an electrochromic device.

5. An electrode comprising one or more O3/P2 mixed-phase sodium-containing doped layered oxide materials according to claim 1.

6. The O3/P2 mixed-phase sodium-containing doped layered oxide material according to claim 1, wherein the O3/P2 mixed-phase sodium-containing layered oxide material comprises greater than 65 to 99% of the first phase, and less than 35 to 1% of the second phase, based on the combined total number of moles of the first and second phases present in the O3/P2 mixed-phase sodium-containing layered oxide material.

7. The O3/P2 mixed-phase sodium-containing doped layered oxide material according to claim 1, wherein the O3/P2 mixed-phase sodium-containing layered oxide material comprises greater than 75 to 99% of the first phase, and less than 25 to 1% of the second phase, based on the combined total number of moles of the first and second phases present in the O3/P2 mixed-phase sodium-containing layered oxide material.

8. A process of preparing an O3/P2 mixed-phase sodium-containing doped layered oxide material according to claim 1, comprising the steps:
  i) forming a mixture of precursor materials to provide metal atoms in the stoichiometric ratios that are present in the O3/P2 mixed-phase sodium-containing doped layered oxide material of the general formula; and
  ii) heating the resulting mixture of precursor materials at a temperature of at least 500° C. to yield the O3/P2 mixed-phase sodium-containing doped layered oxide material,
  wherein the process does not involve either:
    i) forming a mixture of precursor materials which provide metal atoms in the stoichiometric ratios that are present in an O3/P2 mixed-phase sodium-containing doped layered oxide material with the formula $Na_{0.833}Ni_{0.317}Mn_{0.467}Mg_{0.100}Ti_{0.17}O_2$ and
    ii) heating the resulting mixture at 900° C. for 10 hours to produce a O3/P2 mixed-phase sodium-containing doped layered oxide material which comprises a mixture of phases in which a first phase has an O3-type structure and a second phase has a P2-type structure, wherein the amount of the first phase is 63% and the amount of the second phase is 37%, based on the combined total number of moles of the first and second phases present in the O3/P2 mixed-phase sodium-containing doped layered oxide material;
  or
    i) forming a mixture of precursor materials which provide metal atoms in the stoichiometric ratios that are present in an O3/P2 mixed-phase sodium-containing doped layered oxide material with the formula $Na_{0.95}Ni_{0.3167}Mn_{0.3167}Mg_{0.1583}Ti_{0.2083}O_2$ and
    ii) heating the resulting mixture at 900° C. for 4 minutes to produce a O3/P2 mixed-phase sodium-containing doped layered oxide material which comprises a mixture of phases in which a first phase has an O3-type structure and a second phase has a P2-type structure, wherein the amount of the first phase is 97% and the amount of the second phase is 3%, based on the combined total number of moles of the first and second phases present in the O3/P2 mixed-phase sodium-containing doped layered oxide material.

9. A process according to claim 8 for preparing O3:P2 mixed-phase sodium-containing doped layered oxide materials selected from:
  $NaNi_{0.400}Mn_{0.490}Mg_{0.100}Ti_{0.010}O_2$ (comprising greater than 60% to 99% of a first phase with an O3-type structure and less than 40% to 1% of a second phase with a P2-type structure);
  $Na_{0.95}Ni_{0.3167}Mn_{0.3167}Mg_{0.1583}Ti_{0.2083}O_2$ (comprising greater than 60% to 99%, but not 97%, of a first phase with an O3-type structure and less than 40% to 1%, but not 3%, of a second phase with a P2-type structure);
  $Na_{0.925}Ni_{0.4525}Mn_{0.5275}Mg_{0.01}Ti_{0.01}O_2$ (comprising greater than 60% to 99% of a first phase with an O3-type structure and less than 40% to 1% of a second phase with a P2-type structure);
  $Na_{0.867}Ni_{0.383}Mn_{0.467}Mg_{0.05}Ti_{0.1}O_2$ (comprising greater than 60% to 99% of a first phase with an O3-type structure and less than 40% to 1% of a second phase with a P2-type structure);
  $Na_{0.833}Ni_{0.317}Mn_{0.467}Mg_{0.1}Ti_{0.117}O_2$ (comprising greater than 60% to 99%, but not 63%, of a first phase with an O3-type structure and less than 40% to 1%, but not 37%, of a second phase with a P2-type structure);
  $Na_{0.8}Ni_{0.35}Mn_{0.48}Mg_{0.05}Ti_{0.12}O_2$ (comprising greater than 60% to 99% of a first phase with an O3-type structure and less than 40% to 1% of a second phase with a P2-type structure);
  $Na_{0.77}Ni_{0.28}Mn_{0.31}Mg_{0.05}Ti_{0.25}Fe_{0.11}O_2$ (comprising greater than 60% to 99% of a first phase with an O3-type structure and less than 40% to 1% of a second phase with a P2-type structure);
  $Na_{0.77}Ni_{0.225}Mn_{0.115}Mg_{0.01}Ti_{0.35}Fe_{0.3}O_2$ (comprising greater than 60% to 99% of a first phase with an O3-type structure and less than 40% to 1% of a second phase with a P2-type structure);
  $Na_{0.867}Ni_{0.333}Mn_{0.467}Mg_{0.1}Ti_{0.1}O_2$ (comprising greater than 60% to 99% of a first phase with an O3-type structure and less than 40% to 1% of a second phase with a P2-type structure);
  $Na_{0.833}Ni_{0.317}Mn_{0.417}Mg_{0.05}Ti_{0.117}Co_{0.1}O_2$ (comprising greater than 60% to 99% of a first phase with an O3-type structure and less than 40% to 1% of a second phase with a P2-type structure);
  $Na_{0.867}Ni_{0.383}Mn_{0.467}Mg_{0.05}Ti_{0.1}O_2$ (comprising greater than 60% to 99% of a first phase with an O3-type structure and less than 40% to 1% of a second phase with a P2-type structure);
  $Na_{0.85}Ni_{0.325}Mn_{0.525}Mg_{0.100}Ti_{0.05}O_2$ (comprising greater than 60% to 99% of a first phase with an O3-type structure and less than 40% to 1% of a second phase with a P2-type structure);
  $Na_{0.85}Ni_{0.325}Mn_{0.499}Mg_{0.100}Ti_{0.076}O_2$ (comprising greater than 60% to 99% of a first phase with an O3-type structure and less than 40% to 1% of a second phase with a P2-type structure);

$Na_{0.77}Ni_{0.305}Mn_{0.51}Mg_{0.025}Ti_{0.05}Al_{0.055}Co_{0.055}O_2$ (comprising greater than 60% to 99% of a first phase with an O3-type structure and less than 40% to 1% of a second phase with a P2-type structure;

$Na_{0.77}Ni_{0.305}Mn_{0.535}Mg_{0.025}Ti_{0.025}Al_{0.055}Co_{0.055}O_2$ (comprising greater than 60% to 99% of a first phase with an O3-type structure and less than 40% to 1% of a second phase with a P2-type structure;

$NaNi_{0.4}Mn_{0.49}Mg_{0.1}Ti_{0.01}O_2$ (comprising greater than 60% to 99% of a first phase with an O3-type structure and less than 40% to 1% of a second phase with a P2-type structure);

$Na_{0.77}Ni_{0.28}Mn_{0.51}Mg_{0.05}Ti_{0.05}Al_{0.055}Co_{0.055}O_2$ (comprising greater than 60% to 99% of a first phase with an O3-type structure and less than 40% to 1% of a second phase with a P2-type structure);

$Na_{0.833}Fe_{0.200}Mn_{0.483}Mg_{0.0917}Cu_{0.225}O_2$ (comprising greater than 60% to 99% of a first phase with an O3-type structure and less than 40% to 1% of a second phase with a P2-type structure);

$Na_{0.775}Ni_{0.35}Mn_{0.475}Ti_{0.1}Al_{0.075}O_2$ (comprising greater than 60% to 99% of a first phase with an O3-type structure and less than 40% to 1% of a second phase with a P2-type structure); and $Na_{0.833}Ca_{0.05}Ni_{0.3417}Mn_{0.4417}Mg_{0.125}Ti_{0.0917}O_2$ (comprising greater than 60% to 99% of a first phase with an O3-type structure and less than 40% to 1% of a second phase with a P2-type structure);

wherein the percentage values for each of the first and second phases are based on the combined total number of moles of the first and second phases present in the O3/P2 mixed-phase sodium-containing doped layered oxide material.

* * * * *